United States Patent
Satou et al.

(10) Patent No.: US 7,749,403 B2
(45) Date of Patent: *Jul. 6, 2010

(54) MONOFLUORINATED TERPHENYL COMPOUND HAVING ALKENYL, LIQUID CRYSTAL COMPOSITION, AND LIQUID CRYSTAL DISPLAY DEVICE

(75) Inventors: Teizi Satou, Ichihara (JP); Tomoyuki Kondou, Ichihara (JP); Norikatsu Hattori, Ichihara (JP); Hiroaki Fujita, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 104 days.

This patent is subject to a terminal disclaimer.

(21) Appl. No.: 12/159,611

(22) PCT Filed: Dec. 26, 2006

(86) PCT No.: PCT/JP2006/325973

§ 371 (c)(1),
(2), (4) Date: Jun. 27, 2008

(87) PCT Pub. No.: WO2007/077844

PCT Pub. Date: Jul. 12, 2007

(65) Prior Publication Data

US 2009/0206300 A1    Aug. 20, 2009

(30) Foreign Application Priority Data

Jan. 6, 2006 (JP) .............. 2006-001692
Mar. 20, 2006 (JP) .............. 2006-077591

(51) Int. Cl.
C09K 19/00 (2006.01)
C09K 19/06 (2006.01)
C09K 19/52 (2006.01)
G02F 1/03 (2006.01)

(52) U.S. Cl. .............. 252/299.01; 252/299.61; 252/299.62; 252/299.63; 252/299.66; 430/20; 428/1.1

(58) Field of Classification Search ............ 252/299.01, 252/299.61–299.63, 299.66; 428/1.1; 430/20
See application file for complete search history.

(56) References Cited

U.S. PATENT DOCUMENTS 7,597,944 B2 * 10/2009 Fujita .................. 428/1.1
2009/0090892 A1 * 4/2009 Fujita et al. ............ 252/299.63

FOREIGN PATENT DOCUMENTS

| EP | 1126006 | 8/2001 |
| JP | 11-043450 | 2/1999 |
| JP | 11-061132 | 3/1999 |
| JP | 2001-011456 | 1/2001 |

* cited by examiner

Primary Examiner—Geraldina Visconti
(74) Attorney, Agent, or Firm—J.C. Patents

(57) ABSTRACT

A liquid crystal compound is provided that has stability to heat and an ultraviolet ray, a small viscosity, a suitable refractive index anisotropy, a suitable dielectric anisotropy, a nematic phase within a wide temperature range and favorable compatibility with other liquid crystal compounds, and a liquid crystal composition is also provided that has a particularly small viscosity. The liquid crystal compound is a compound represented by formula (1):

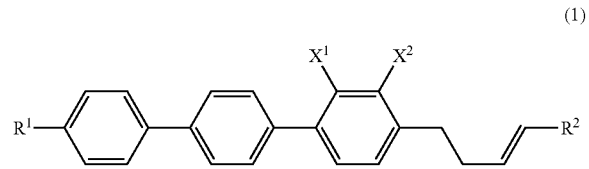

(1)

wherein in formula (1), $R^1$ is hydrogen or alkyl having 1 to 5 carbons; one of $X^1$ and $X^2$ is hydrogen, and the other thereof is fluorine; and $R^2$ is hydrogen or methyl.

22 Claims, No Drawings

MONOFLUORINATED TERPHENYL COMPOUND HAVING ALKENYL, LIQUID CRYSTAL COMPOSITION, AND LIQUID CRYSTAL DISPLAY DEVICE

CROSS-REFERENCE TO RELATED APPLICATIONS

This application is a national phase application of international application No. PCT/JP2006/325973 filed on Dec. 26, 2006, which claims the priority benefit of Japan application No. 2006-001692 filed on Jan. 6, 2006 and Japan application No. 2006-077591 filed on Mar. 20, 2006. The contents of these prior applications are hereby incorporated by reference in its entirety.

BACKGROUND OF THE INVENTION

1. Field of the Invention

The invention relates to a novel liquid crystal compound useful as a material for a liquid crystal display device, and a liquid crystal composition containing the compound. More specifically, it relates to a novel liquid crystal compound that has a low viscosity, favorable compatibility with other liquid crystal compounds, has a suitable refractive index anisotropy and a suitable dielectric anisotropy, and is capable of providing steep electrooptical characteristics with respect to an applied voltage upon using in a liquid crystal display device, and relates to a liquid crystal composition containing the compound, and a liquid crystal display device containing the liquid crystal composition.

2. Related Art

Active matrix (AM) type or passive matrix (PM) type liquid crystal display devices driven in such modes as TN, STN, PC, ECB, OCB, IPS, VA and so forth have been developed, and as a liquid crystal compound used in the liquid crystal display devices, terphenyl derivatives having alkenyl have been synthesized. For example, JP H11-61132 A/1999 discloses a compound represented by formula (s-1) shown below and a composition containing the compound. EP 1126006A discloses compounds represented by formulas (s-2) and (s-3) shown below, JP H11-43450 A/1999 discloses compounds represented by formulas (s-4) and (s-5) shown below, and JP 2001-11456 A/2001 discloses compounds represented by formulas (s-6) shown below.

However, the compounds represented by formulas (s-1), (s-6) have a high viscosity. The compounds represented by formulas (s-2) and (s-3) have a tendency of having low chemical stability. The compounds represented by formulas (s-4) and (s-5) have strong smectic property to cause deposition of crystals at a low temperature in some cases.

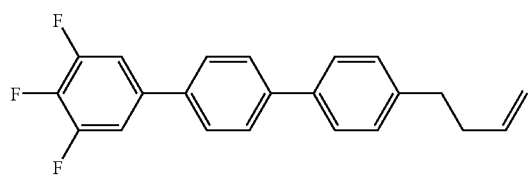

(S-1)

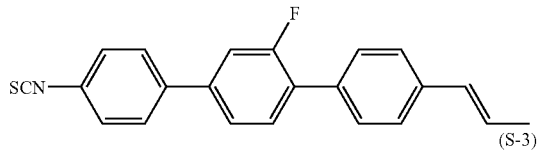

(S-2)

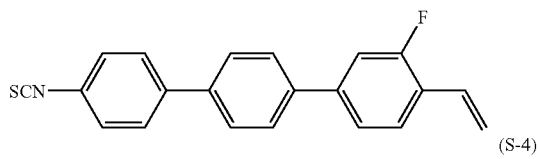

(S-3)

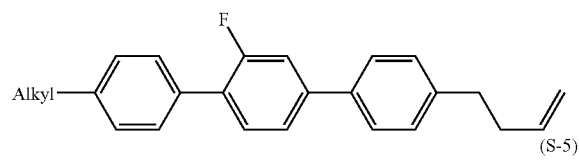

(S-4)

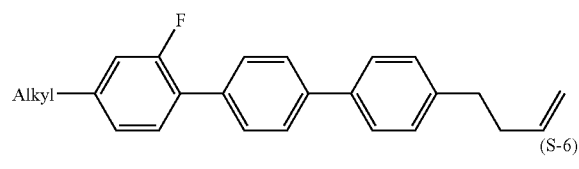

(S-5)

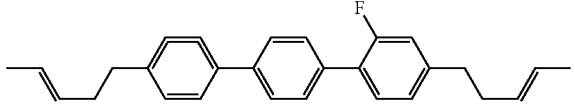

(S-6)

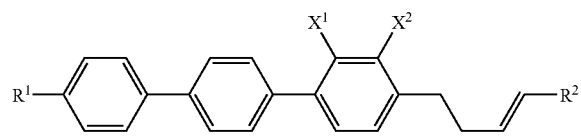

SUMMARY OF THE INVENTION

The invention concerns a compound represented by formula (1):

(1)

In formula (1), $R^1$ is hydrogen or alkyl having 1 to 5 carbons; one of $X^1$ and $X^2$ is hydrogen, and the other thereof is fluorine; and $R^2$ is hydrogen or methyl.

The invention also relates to a liquid crystal composition that contains the compound, and a liquid crystal display device that contains the liquid crystal composition.

DETAILED DESCRIPTION OF THE INVENTION

One advantages of the invention is to provide a liquid crystal compound that has stability to heat and an ultraviolet ray, a suitable refractive index anisotropy, a suitable dielectric anisotropy, a nematic phase within a wide temperature range and favorable compatibility with other liquid crystal compounds, and also has a small viscosity.

Another advantages of the invention is to provide a liquid crystal composition that contains the liquid crystal compound, has a high maximum temperature of a nematic phase, a low minimum temperature of a nematic phase, a suitable refractive index anisotropy, a high specific resistance and a low threshold voltage, and also has a small viscosity.

Still another advantages of the invention is to provide a liquid crystal display device that contains the liquid crystal composition, and has a wide operational temperature range, a small electric power consumption, a large contrast, a low driving voltage, steep electrooptical characteristics with respect to an applied voltage and a long service life, and also has a short response time.

As a result of investigations made by the inventors, it has been found that a particular compound having fluorine and alkenyl on a 1,4-phenylene ring at an end of terphenyl has a nematic phase within a wide temperature range, a large refractive index anisotropy, a high chemical stability and favorable compatibility with other liquid crystal compounds, and also has a low viscosity. It has also found that a liquid crystal display device produced with a liquid crystal composition containing the compound has a wide operational temperature range, and also has a short response time.

The invention includes the following features.

1. A compound represented by formula (1):

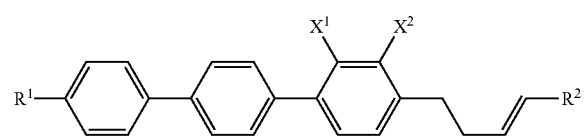

(1)

wherein in formula (1), $R^1$ is hydrogen or alkyl having 1 to 5 carbons; one of $X^1$ and $X^2$ is hydrogen, and the other thereof is fluorine; and $R^2$ is hydrogen or methyl.

2. The compound according to item 1, wherein $R^2$ is hydrogen.

3. The compound according to items 1 or 2, wherein $X^1$ is fluorine, and $X^2$ is hydrogen.

4. A liquid crystal composition comprising at least one compound according to any one of items 1 to 3.

5. The liquid crystal composition according to item 4, wherein the liquid crystal composition further comprises at least one compound selected from the group of compound represented by formulas (2), (3) and (4):

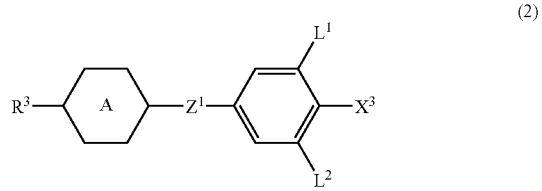

(2)

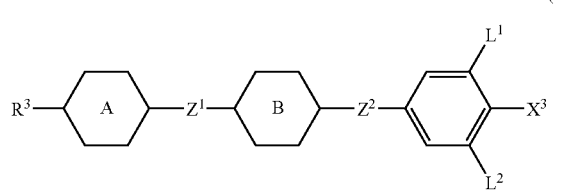

(3)

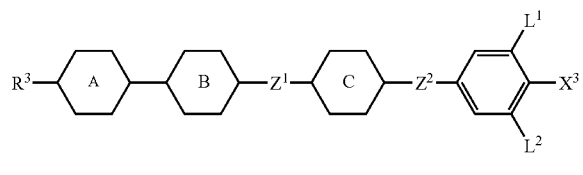

(4)

wherein in formulas (2) to (4), $R^3$ is independently alkyl having 1 to 10 carbons or alkenyl having 2 to 10 carbons, in the alkyl and alkenyl arbitrary hydrogen may be replaced by fluorine, and in the alkyl arbitrary —$CH_2$— may be replaced by —O—;

$X^3$ is independently fluorine, chlorine, —$OCF_3$, —$OCHF_2$, —$CF_3$, —$CHF_2$, —$CH_2F$, —$OCF_2CHF_2$ or —$OCF_2CHFCF_3$;

ring A and ring B are each independently 1,4-cyclohexylene, 1,3-dioxane-2,5-diyl or 1,4-phenylene in which arbitrary hydrogen may be replaced by fluorine; ring C is 1,4-cyclohexylene or 1,4-phenylene in which arbitrary hydrogen may be replaced by fluorine;

$Z^1$ and $Z^2$ are each independently -$(CH_2)_2$—, —$(CH_2)_4$—, —COO—, —$CF_2O$—, —$OCF_2$—, —CH=CH— or a single bond; and $L^1$ and $L^2$ are each independently hydrogen or fluorine.

6. The liquid crystal composition according to item 4, wherein the liquid crystal composition further comprises at least one compound selected from the group of compound represented by formulas (5) and (6):

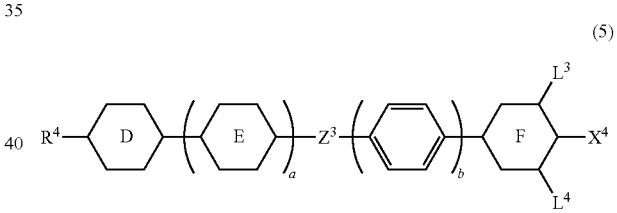

(5)

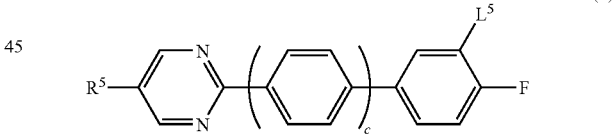

(6)

wherein in formulas (5) and (6), $R^4$ and $R^5$ are each independently alkyl having 1 to 10 carbons or alkenyl having 2 to 10 carbons, in the alkyl and alkenyl arbitrary hydrogen may be replaced by fluorine, and in the alkyl arbitrary —$CH_2$— may be replaced by —O—;

$X^4$ is —C≡N or —C≡C—C≡N;

ring D is 1,4-cyclohexylene, 1,4-phenylene, 1,3-dioxane-2,5-diyl or pyrimidine-2,5-diyl; ring E is 1,4-cyclohexylene, pyrimidine-2,5-diyl or 1,4-phenylene in which arbitrary hydrogen may be replaced by fluorine; ring F is 1,4-cyclohexylene or 1,4-phenylene;

$Z^3$ is —$(CH_2)_2$—, —COO—, —$CF_2O$—, —$OCF_2$— or a single bond;

$L^3$, $L^4$ and $L^5$ are each independently hydrogen or fluorine; and a, b and c are each independently 0 or 1.

7. The liquid crystal composition according to item 4, wherein the liquid crystal composition further comprises at least one compound selected from the group of compound represented by formulas (7), (8), (9), (10) and (11):

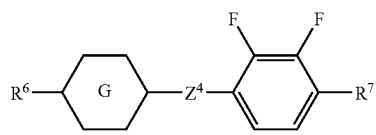
(7)

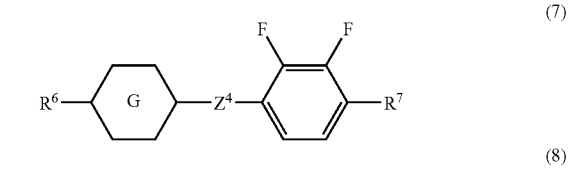
(8)

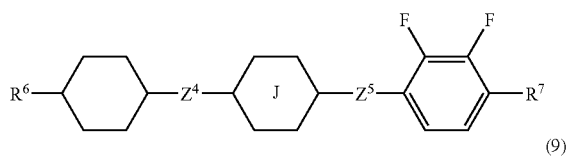
(9)

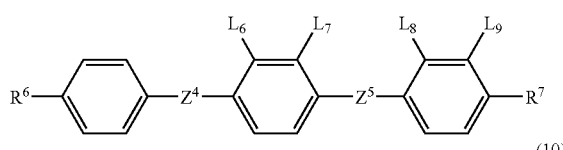
(10)

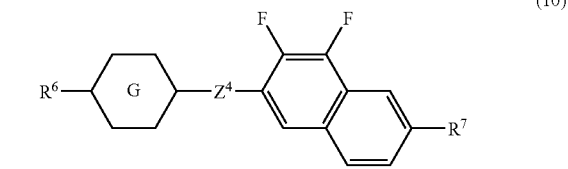
(11)

wherein in formulas (7) to (11), $R^6$ is independently alkyl having 1 to 10 carbons or alkenyl having 2 to 10 carbons, in the alkyl and alkenyl arbitrary hydrogen may be replaced by fluorine, and in the alkyl arbitrary —$CH_2$— may be replaced by —O—;

$R^7$ is independently fluorine, alkyl having 1 to 10 carbons or alkenyl having 2 to 10 carbons, in the alkyl and alkenyl arbitrary hydrogen may be replaced by fluorine, and in the alkyl arbitrary —$CH_2$— may be replaced by —O—;

ring G and ring J are each independently 1,4-cyclohexylene, 1,4-phenylene or decahydro-2,6-naphthylene;

$Z^4$ and $Z^5$ are each independently —$(CH_2)_2$—, —COO— or a single bond; and $L^6$, $L^7$, $L^8$ and $L^9$ are each independently hydrogen or fluorine, provided that at least two of $L^6$, $L^7$, $L^8$ and $L^9$ are fluorine.

8. The liquid crystal composition according to item 4, wherein the liquid crystal composition further comprises at least one compound selected from the group of compound represented by formulas (12), (13) and (14):

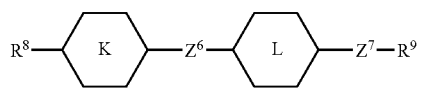
(12)

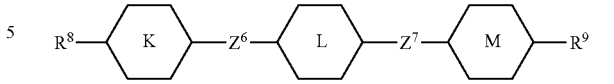
(13)

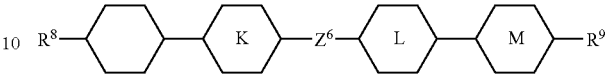
(14)

wherein in formulas (12) to (14), $R^8$ and $R^9$ each independently alkyl having 1 to 10 carbons or alkenyl having 2 to 10 carbons, in the alkyl and alkenyl arbitrary hydrogen may be replaced by fluorine, and in the alkyl arbitrary —$CH_2$— may be replaced by —O—;

ring L is independently 1,4-cyclohexylene, pyrimidine-2,5-diyl, 1,4-phenylene, 2-fluoro-1,4-phenylene, 3-fluoro-1,4-phenylene or 2,5-difluorophenylene;

ring K and ring M are each independently 1,4-cyclohexylene, pyrimidine-2,5-diyl, 1,4-phenylene or 2,5-difluorophenylene; and $Z^6$ and $Z^7$ are each independently —C≡C—, —COO—, —$(CH_2)_2$—, —CH=CH— or a single bond.

9. The liquid crystal composition according to item 5, wherein the liquid crystal composition further comprises at least one compound selected from the group of compound represented by formulas (5) and (6) in item 6.

10. The liquid crystal composition according to item 5, wherein the liquid crystal composition further comprises at least one compound selected from the group of compound represented by formulas (12), (13) and (14) in item 8.

11. The liquid crystal composition according to item 6, wherein the liquid crystal composition further comprises at least one compound selected from the group of compound represented by formulas (12), (13) and (14) in item 8.

12. The liquid crystal composition according to item 7, wherein the liquid crystal composition further comprises at least one compound selected from the group of compound represented by formulas (12), (13) and (14) in item 8.

13. The liquid crystal composition according to any one of items 4 to 12, wherein the liquid crystal composition further comprises an optically active compound.

14. A liquid crystal display device comprising the liquid crystal composition according to any one of items 4 to 13.

The compound of the invention has stability to heat and an ultraviolet ray, a suitable refractive index anisotropy, a suitable dielectric anisotropy, a nematic phase within a wide temperature range and favorable compatibility with other liquid crystal compounds, which are demanded for a liquid crystal compound, and also has a small viscosity. The liquid crystal composition of the invention has a high maximum temperature of a nematic phase, a low minimum temperature of a nematic phase, a suitable refractive index anisotropy, a high specific resistance and a low threshold voltage, and also has a small viscosity. The liquid crystal display device of the invention has a wide operational temperature range, a small electric power consumption, a large contrast, a low driving voltage, steep electrooptical characteristics with respect to an applied voltage and a long service life, and also has a short response time. The liquid crystal display device of the invention can be favorably used as a liquid crystal display device driven in such an operation mode as TN and STN, such as a TFT liquid crystal display device.

The terms used in the specification are defined as follows. The "liquid crystal compound" is a generic term for a compound having a liquid crystal phase such as a nematic phase, a smectic phase and so forth, and also for a compound having no liquid crystal phase but being useful as a component of a liquid crystal composition. The "liquid crystal display device" is a generic term for a liquid crystal display panel and a liquid crystal display module. The higher limit of a temperature range of a nematic phase is a phase transition temperature from a nematic phase to an isotropic phase and may be abbreviated to "a maximum temperature." The lower limit of a temperature range of a nematic phase may be abbreviated to "a minimum temperature." The compound represented by formula (1) may be abbreviated to "the compound (1)." The compounds represented by the other formulas, such as formula (2), are applied with the same rules. The amount of the compound expressed in terms of percentage is the percentage by weight (% by weight) based on the total weight of liquid crystal composition. The invention is described below in more detail.

Liquid Crystal Compound (1)

The liquid crystal compound of the invention represented by formula (1) is described.

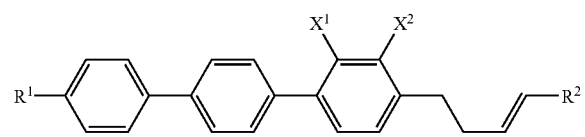

(1)

In formula (1), $R^1$ is hydrogen or alkyl having 1 to 5 carbons; one of $X^1$ and $X^2$ is hydrogen, and the other thereof is fluorine; and $R^2$ is hydrogen or methyl.

The compound (1) is a terphenyl compound and has both fluorine and alkenyl simultaneously on the 1,4-phenylene ring at the end of the terphenyl. The compound (1) is significantly stable physically and chemically under conditions, under which a liquid crystal display device is generally used, and has favorable compatibility with other liquid crystal compounds. A liquid crystal composition containing the compound (1) is stable under conditions, under which a liquid crystal display device is generally used. Upon storing the liquid crystal composition at a low temperature the compound (1) is not deposited as crystals or a smectic phase. The compound has a small viscosity, a suitable refractive index anisotropy and a suitable dielectric anisotropy.

The properties, such as the refractive index anisotropy, the dielectric anisotropy, the temperature range of a nematic phase and so forth, can be controlled by selecting suitably the end groups and the position of fluorine of the compound (1). The effects of the preferred end groups and the position of fluorine in the compound (1) on the properties of the compound (1) are shown below.

In the case where $R^1$ in the compound (1) is a linear chain, the compound (1) has a wide temperature range of a liquid crystal phase and a small viscosity. In the case where $R^1$ is a branched chain, the compound (1) has favorable compatibility with other liquid crystal compounds. The compound (1) having an optically active group as $R^1$ is useful as a chiral dopant. The addition of the compound to a liquid crystal composition prevents a reverse twisted domain from being generated in a liquid crystal display device. The compound (1) having no optically active group as $R^1$ is useful as a component of a liquid crystal composition.

For attaining a smaller viscosity and a higher maximum temperature of a nematic phase, $R^1$ is preferably a group having a linear chain. For inducing a helical structure in a liquid crystal composition, $R^1$ is preferably optically active.

For suppressing a smectic phase from being generated, preferred examples of $R^1$ include —H, —$CH_3$, —$C_2H_5$, —$C_3H_7$ or —$C_4H_9$.

In the case where $R^1$ is —H, a nematic phase can be obtained within a wider temperature range.

In the case where $R^1$ is —$CH_3$, favorable electric characteristics can be obtained.

In the case where $R^1$ is —$C_2H_5$ or —$C_3H_7$, favorable compatibility can be obtained.

$R^2$ in the compound (1) is hydrogen or methyl (—$CH_3$). In the case where $R^2$ is hydrogen, the compound (1) has a small viscosity and favorable compatibility with other liquid crystal compounds. In the case where $R^2$ is methyl, the compound (1) has a wide temperature range of a liquid crystal phase.

For attaining a small viscosity, $R^2$ is preferably hydrogen. For attaining a small viscosity, in the case where $R^2$ is —$CH_3$, the configuration thereof is preferably trans (E) based on the plane containing the adjacent carbon-carbon double bond with respect to the other atomic group.

For attaining a small viscosity and high compatibility with other liquid crystal compounds, $R^2$ is more preferably hydrogen.

In the compound (1), one of $X^1$ and $X^2$ is hydrogen, and the other thereof is fluorine. In the case where $X^1$ is fluorine, and $X^2$ is hydrogen, the compound (1) has a small viscosity and favorable compatibility with other liquid crystal compounds. In the case where $X^1$ is hydrogen, and $X^2$ is fluorine, the compound (1) has a high maximum temperature of a nematic phase.

As having been described, a compound having an intended property can be obtained by selecting suitably the positions of the end groups and fluorine. Accordingly, the compound (1) is useful as a component of a liquid crystal composition used in a liquid crystal display device driven in such mode as PC, TN, STN, ECB, OCB, IPS, VA and so forth.

Preferred examples of the compound (1) include compounds represented by formula (1-1). The meanings of $R^1$ and $R^2$ in the compounds are the same as those in the compound (1).

In the case where the compound (1) is the compound (1-1), the compound (1) has high compatibility with other liquid crystal compounds.

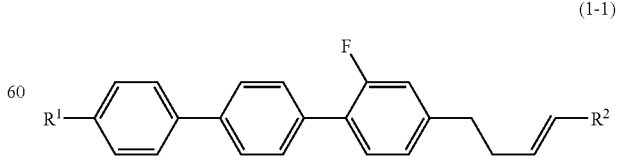

(1-1)

More preferred examples of the compound (1) include compounds represented by formula (1-2). The meaning of $R^1$ in the compounds is the same as that in the compound (1).

In the case where the compound (1) is the compound (1-2), the compound (1) has a small viscosity and high compatibility with other liquid crystal compounds.

(1-2)

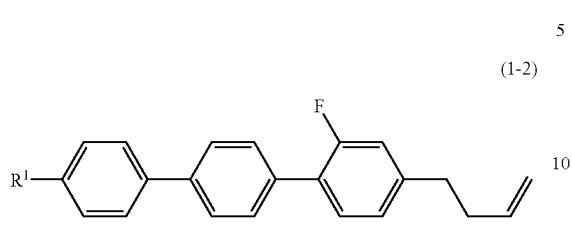

The compound (1) of the invention can be synthesized by appropriately combining synthesis methods of synthetic organic chemistry. Examples of a method for introducing the target end groups and rings structures into starting materials are disclosed in such literatures as Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.), and so forth.

One example of a synthesis method of the compound (1) as a terphenyl compound is described. In the scheme, $MSG^1$ and $MSG^2$ are each a monovalent organic group. Plural groups of $MSG^1$ (or $MSG^2$) may be the same as each other or different from each other. The compound (1A) corresponds to the compound (1).

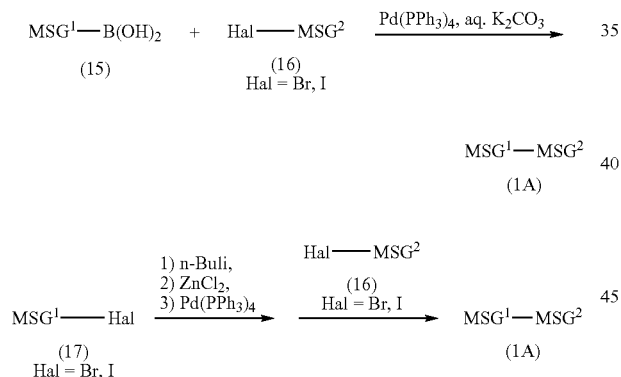

Formation of Single Bond

An aryl boric acid (15) and a compound (16) synthesized by a known method are reacted with each other in the presence of a carbonate salt aqueous solution and a catalyst, such as tetrakis(triphenylphosphine) palladium, to synthesize a compound (1A). The compound (1A) can also be synthesized by reacting n-butyllithium with a compound (17) synthesized by a known method, then reacting zinc chloride, and further reacting the compound (16) in the presence of a catalyst, such as tetrakis(triphenylphosphine) palladium.

A specific example of a method of introducing alkenyl to a compound represented by formula (1-a) is shown by the following scheme. In the scheme, the meanings of $R^1$, $R^2$, $X^1$ and $X^2$ are the same as those in the compound (1).

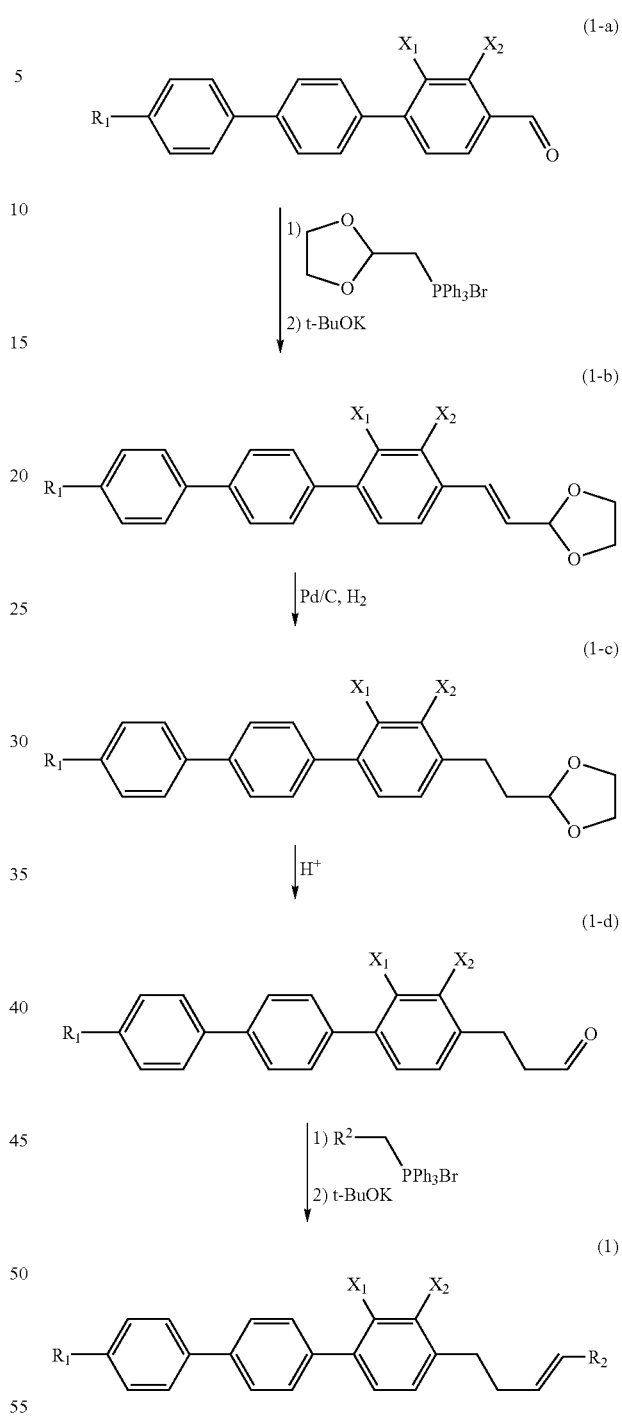

An aldehyde compound (1-a) is produced according to the aforementioned method. An ylide prepared from a phosphonium salt of acetal and potassium t-butoxide is reacted with the aldehyde compound (1-a) to produce an olefin (1-b).

The olefin (1-b) is subjected to hydrogenation with palladium carbon as a catalyst to provide a compound (1-c), and the acetal protective group is removed by acting an acid to convert to an aldehyde (1-c). A phosphoylide is reacted with the aldehyde (1-c) to produce the compound (1) of the invention.

Liquid Crystal Composition

The liquid crystal composition of the invention will be described below. The liquid crystal composition of the invention contains at least one compound selected from the compounds (1) in a ratio of from 1% to 99%. The liquid crystal composition may further contain liquid crystal compounds represented by formulas (2) to (14). Upon preparing the liquid crystal composition, the components may be selected in consideration of the viscosity of the compound (1) or the nematic phase transition temperature of the compound (1).

In the liquid crystal composition, a liquid crystal composition containing at least one compound selected from the compounds (1) and at least one compound selected from the group of the compounds (2), (3) and (4) is preferred for preparing a liquid crystal composition that has a positive dielectric anisotropy and is preferably used in an AM mode display device with high reliability.

In the liquid crystal composition, a liquid crystal composition containing at least one compound selected from the compounds (1) and at least one compound selected from the group of the compounds (5) and (6) is preferred for preparing a liquid crystal composition that is preferably used in a liquid crystal display device driven in an STN mode having a significantly large positive dielectric anisotropy.

In the liquid crystal composition, a liquid crystal composition containing at least one compound selected from the compounds (1), at least one compound selected from the group of the compounds (2), (3) and (4) and at least one compound selected from the group of the compounds (5) and (6) is preferred for preparing a liquid crystal composition having a larger positive dielectric anisotropy and a low minimum temperature of a nematic phase.

The liquid crystal composition may further contain at least one compound selected from the group of the compounds represented by formulas (12), (13) and (14) for the purpose of controlling the temperature range of a liquid crystal phase, the viscosity, the refractive index anisotropy, the dielectric anisotropy, the threshold voltage and so forth of the liquid crystal phase of the liquid crystal composition.

The liquid crystal composition may further contain at least one compound selected from the group of the compounds represented by formulas (7) to (11) for the purpose of further controlling the properties of the liquid crystal composition.

The liquid crystal composition may further contain such compounds as other liquid crystal compounds, additives and so forth for adapting the liquid crystal composition to an AM mode liquid crystal display device driven in a TN mode and a liquid crystal display device driven in an STN mode.

In the liquid crystal composition, a liquid crystal composition containing at least one compound selected from the compounds (1) and at least one compound selected from the group of the compounds (2), (3) and (4) is preferably used in an AM mode liquid crystal display device driven in a TN mode owing to a large positive dielectric anisotropy of the compounds (2), (3) and (4). In the liquid crystal composition of the invention, the content of the compounds (1) to (4) is generally from 1% to 99%, preferably from 10% to 97%, and more preferably from 40% to 95%. In the case where the compound (12), (13) or (14) is added to the liquid crystal composition, the amount of the compound (12), (13) or (14) is preferably 60% or less, and more preferably 40% or less.

In the liquid crystal composition, a liquid crystal composition containing at least one compound selected from the compounds (1) and at least one compound selected from the group of the compounds (5) and (6) is preferably used in a liquid crystal display device driven in an STN mode owing to a significantly large positive dielectric anisotropy of the compounds (5) and (6). In the liquid crystal composition of the invention, the content of the compounds (1), (5) and (6) is generally from 1% to 99%, preferably from 10% to 97%, and more preferably from 40% to 95%. In the case where the compound (12), (13) or (14) is added to the liquid crystal composition, the amount of the compound (12), (13) or (14) is preferably 60% or less, and more preferably 40% or less.

In the liquid crystal composition, a liquid crystal composition containing at least one compound selected from the compounds (1) and at least one compound selected from the group of the compounds (7), (8), (9), (10) and (11) is preferably used in a liquid crystal display device driven in a VA mode owing to a negative dielectric anisotropy of the compounds (7), (8), (9), (10) and (11). In the liquid crystal composition of the invention, the content of the compounds (1), (7), (8), (9), (10) and (11) is generally 80% or less, and preferably from 40% to 80%. In the case where the compound (12), (13) or (14) is added to the liquid crystal composition, the amount of the compound (12), (13) or (14) is preferably 60% or less, and more preferably 40% or less.

The compounds (12), (13) and (14) have a small dielectric anisotropy. The compound (12) is used mainly for controlling the viscosity or the refractive index anisotropy. The compounds (13) and (14) are used mainly for increasing the maximum temperature to enhance the temperature range of a liquid crystal phase or for controlling the refractive index anisotropy. When the amounts of the compounds (12), (13) and (14) are increased, the threshold voltage of the liquid crystal composition is increased, and the viscosity thereof is decreased. Accordingly, these compounds may be used in a large amount as far as the threshold voltage of the liquid crystal composition satisfies the demanded value.

Specific examples of the compounds (2) to (14) include compounds represented by formulas (2-1) to (2-9), compounds represented by formulas (3-1) to (3-97), compounds represented by formulas (4-1) to (4-34), compounds represented by formulas (5-1) to (5-56), compounds represented by formulas (6-1) to (6-3), compounds represented by formulas (7-1) to (7-4), compounds represented by formulas (8-1) to (8-6), compounds represented by formulas (9-1) to (9-3), a compound represented by formula (10-1), a compound represented by formula (11-1), compounds represented by formulas (12-1) to (12-11), compounds represented by formulas (13-1) to (13-21), and compounds represented by formulas (14-1) to (14-6). In the compounds, the meanings of $R^3$, $R^4$, $R^5$, $R^6$, $R^7$, $R^8$, $R^9$, $X^3$ and $X^4$ are the same as those in the compounds (2) to (14).

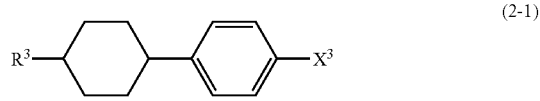

(2-1)

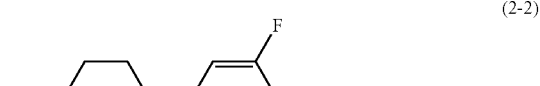

(2-2)

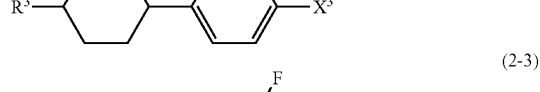

(2-3)

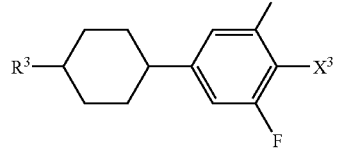

-continued
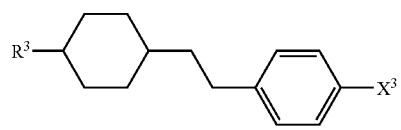 (2-4)
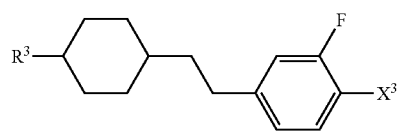 (2-5)
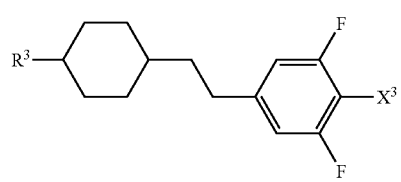 (2-6)
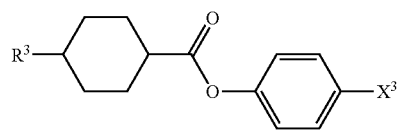 (2-7)
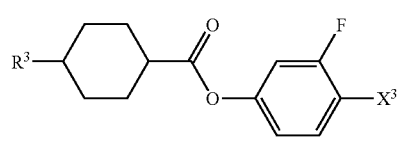 (2-8)
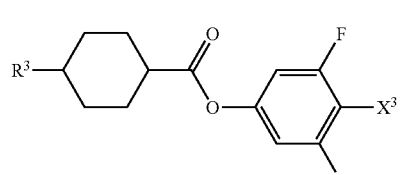 (2-9)
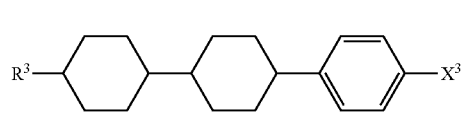 (3-1)
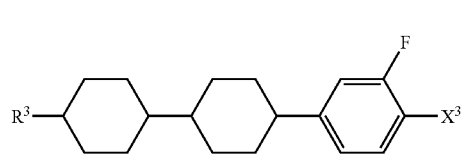 (3-2)
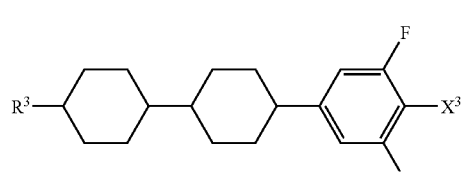 (3-3)
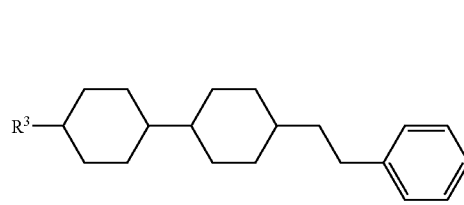 (3-4)
-continued
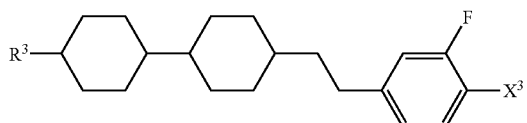 (3-5)
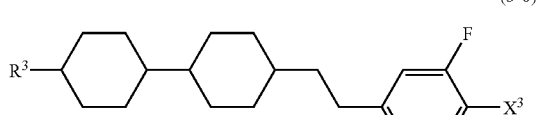 (3-6)
 (3-7)
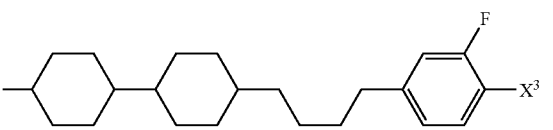 (3-8)
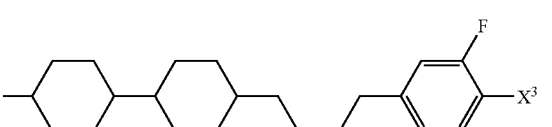 (3-9)
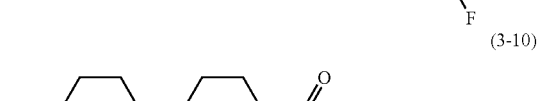 (3-10)
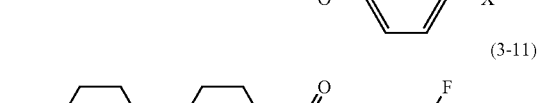 (3-11)
 (3-12)
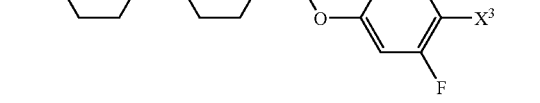 (3-13)
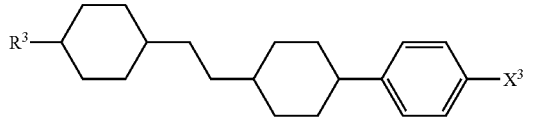 (3-14)

-continued
(3-15)
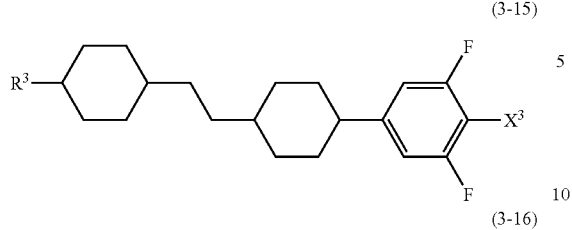
(3-16)
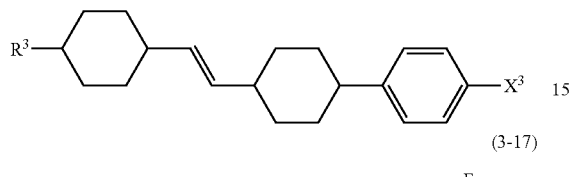
(3-17)
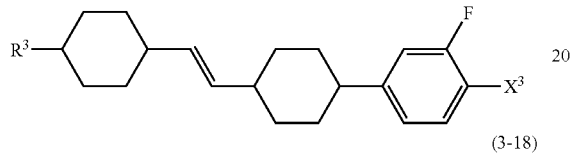
(3-18)
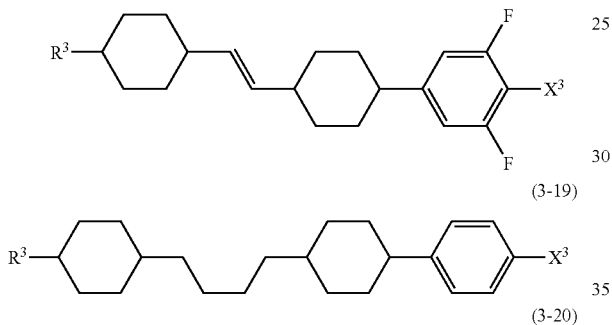
(3-19)
(3-20)
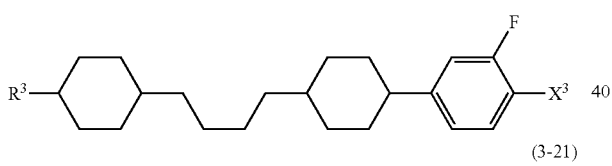
(3-21)
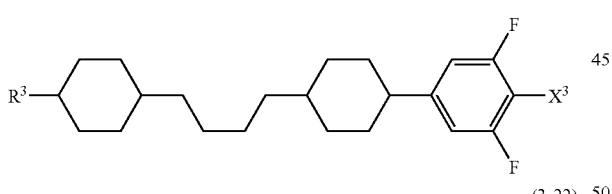
(3-22)
(3-23)
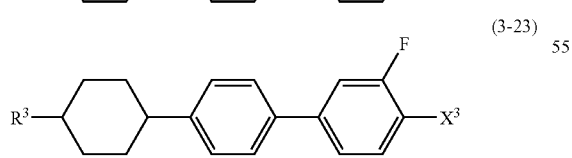
(3-24)
-continued
(3-25)
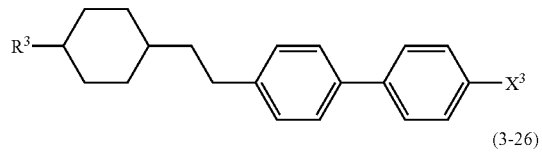
(3-26)
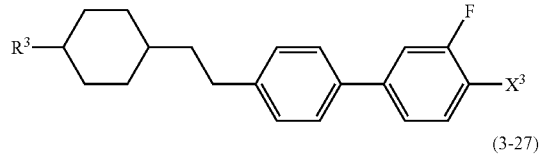
(3-27)
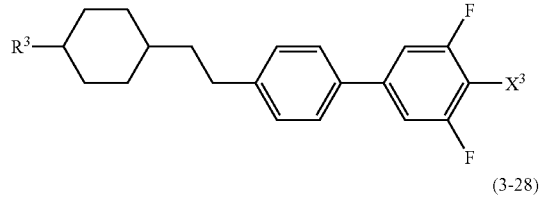
(3-28)
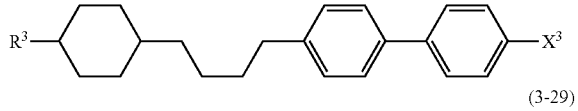
(3-29)
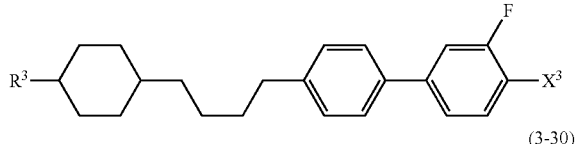
(3-30)
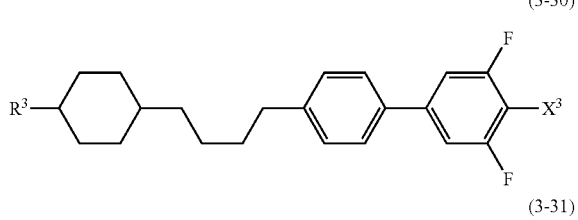
(3-31)
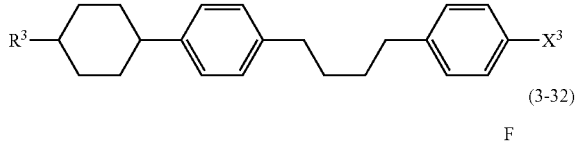
(3-32)
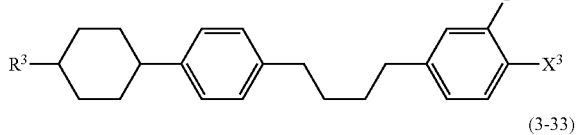
(3-33)
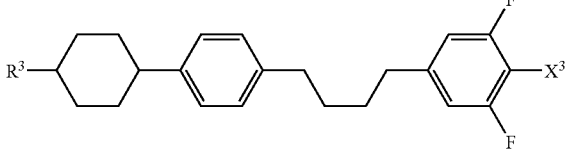
(3-34)
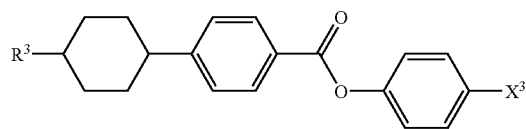

-continued
(3-35)
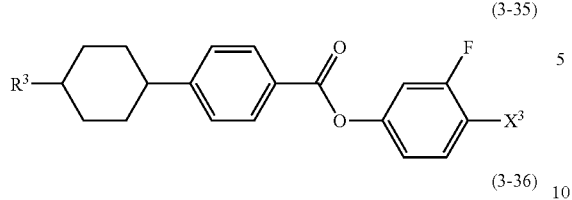
(3-36)
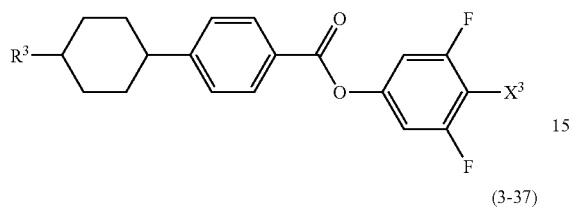
(3-37)
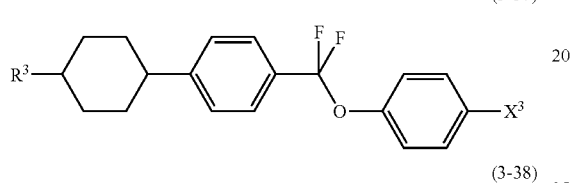
(3-38)
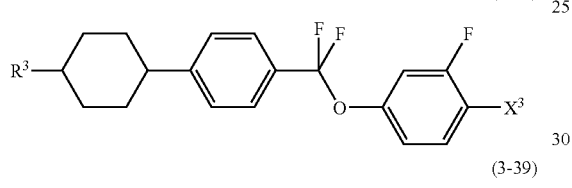
(3-39)
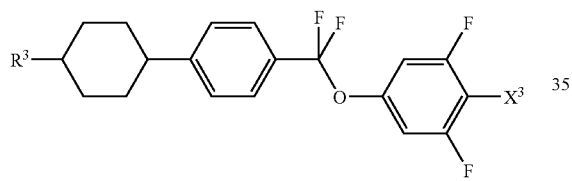
(3-40)
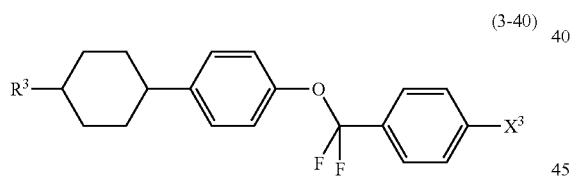
(3-41)
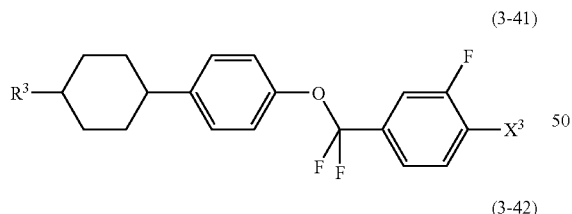
(3-42)
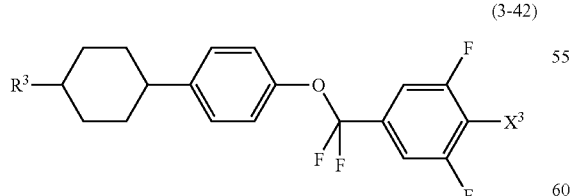
(3-43)
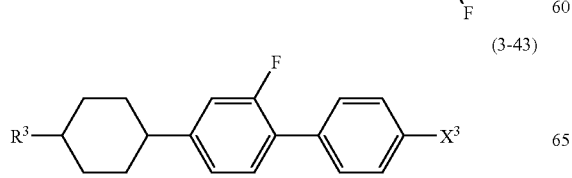
-continued
(3-44)
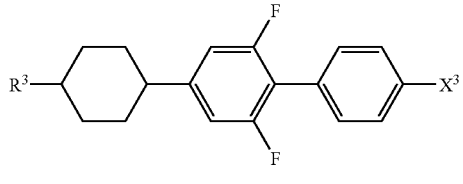
(3-45)
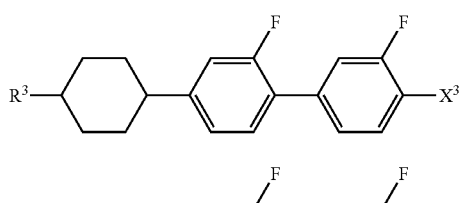
(3-46)
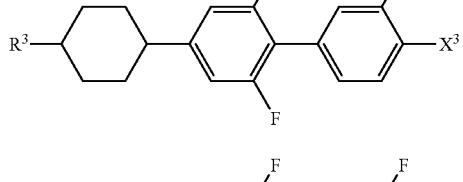
(3-47)
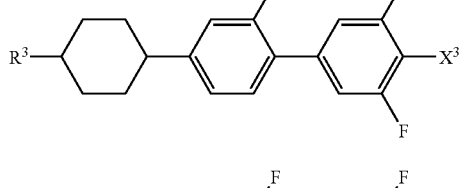
(3-48)
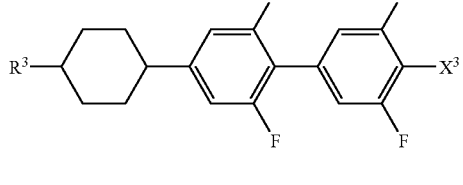
(3-49)
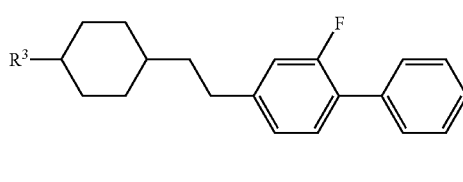
(3-50)
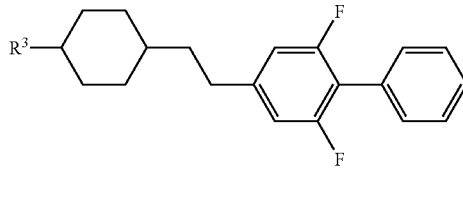
(3-51)
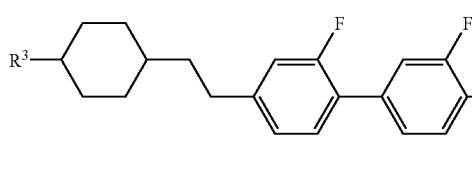
(3-52)
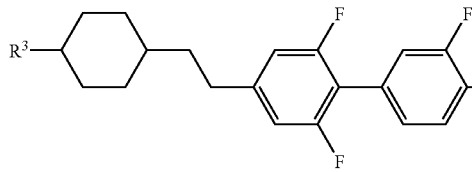

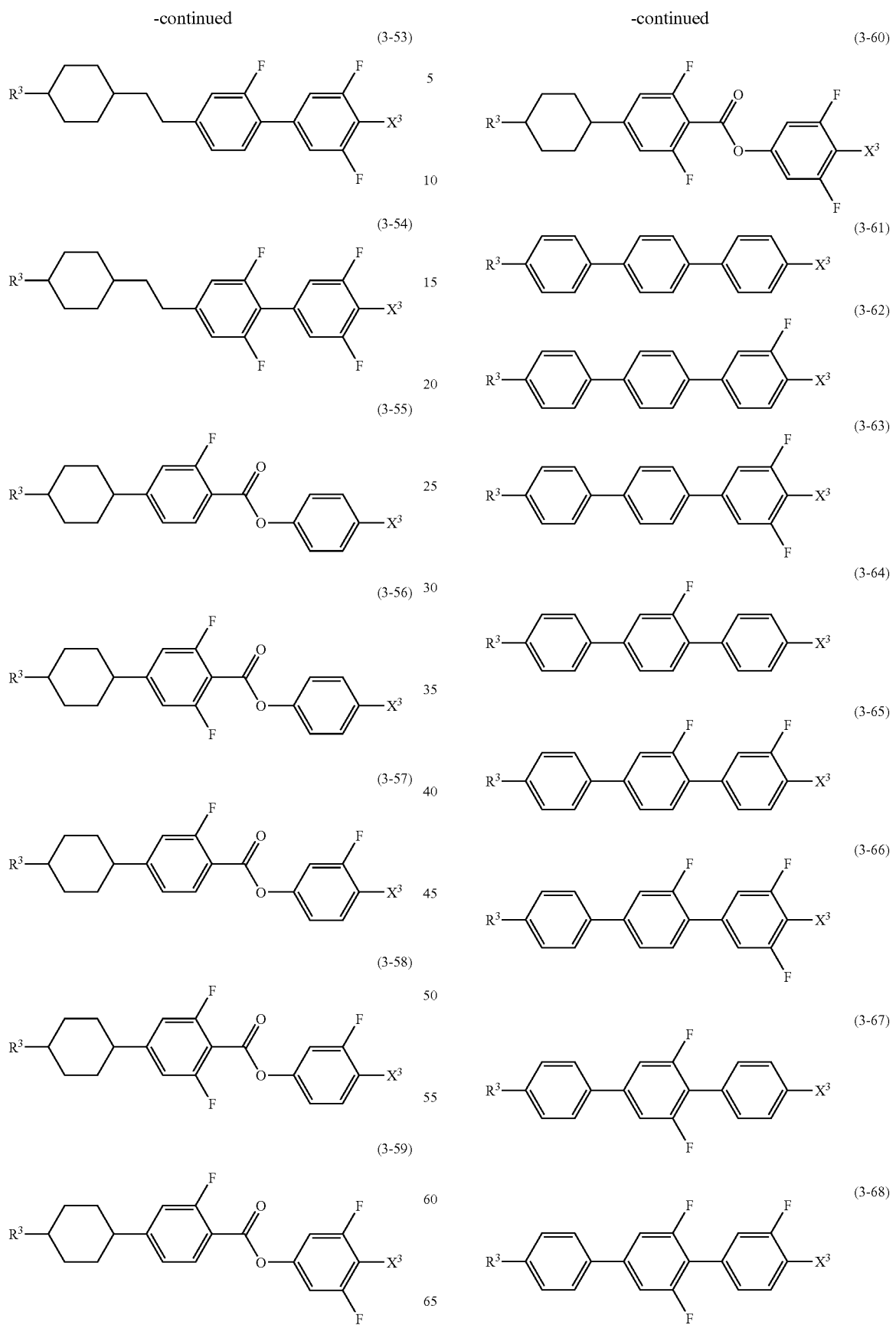

(3-69)
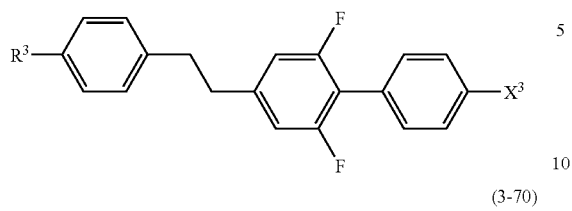
(3-70)
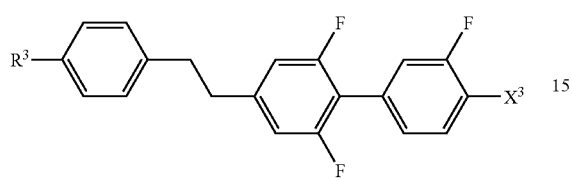
(3-71)
(3-72)
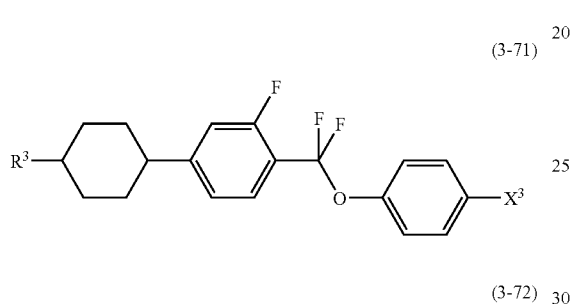
(3-73)
(3-74)
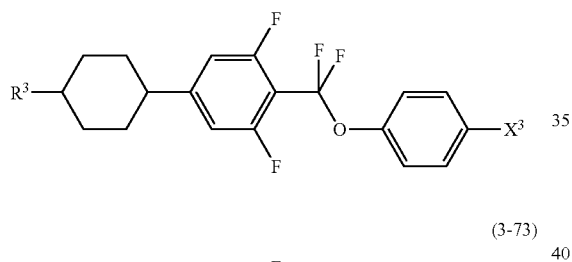
(3-75)
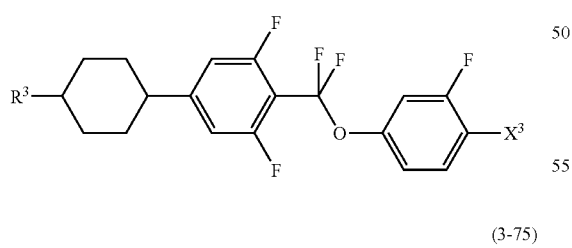
(3-76)
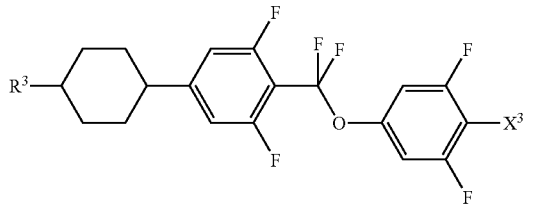
(3-77)
(3-78)
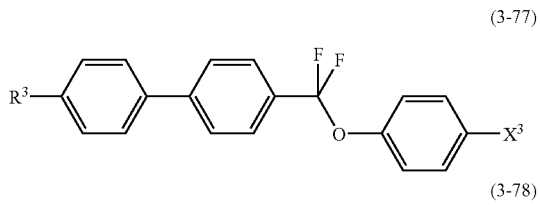
(3-79)
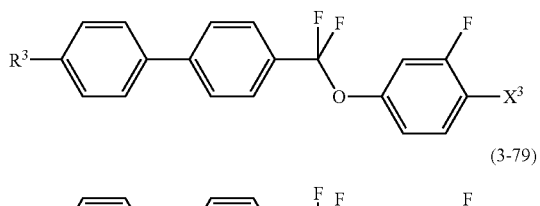
(3-80)
(3-81)
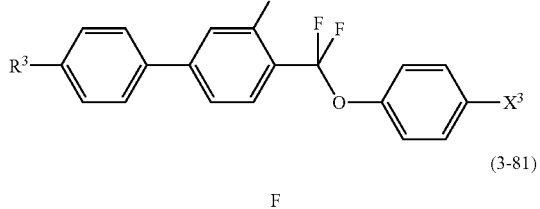
(3-82)
(3-83)
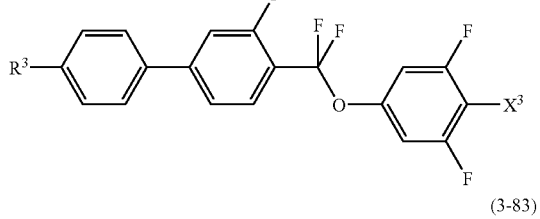

-continued
(3-84)
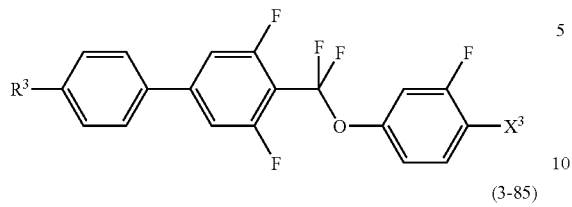
(3-85)
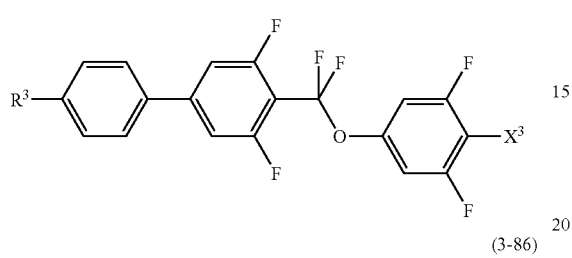
(3-86)
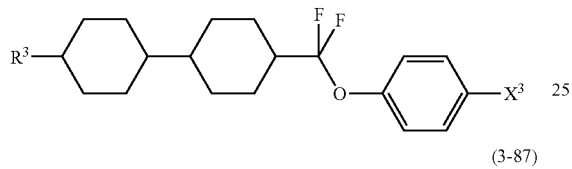
(3-87)
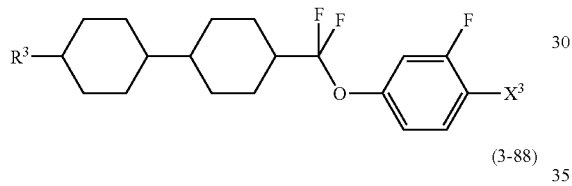
(3-88)
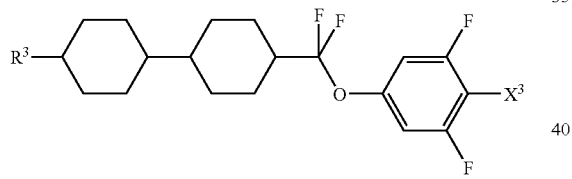
(3-89)
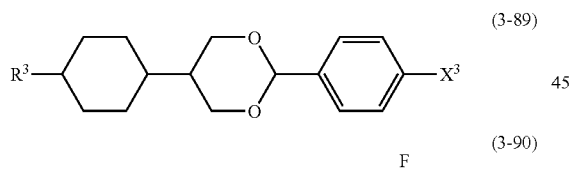
(3-90)
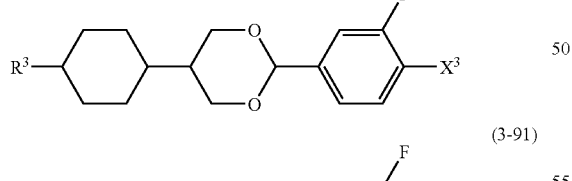
(3-91)
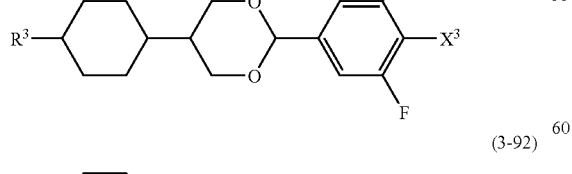
(3-92)
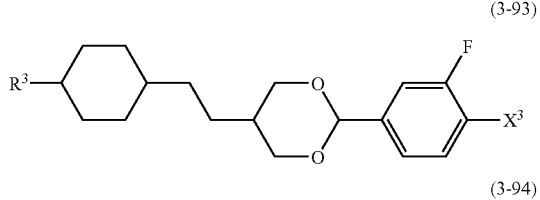
-continued
(3-93)
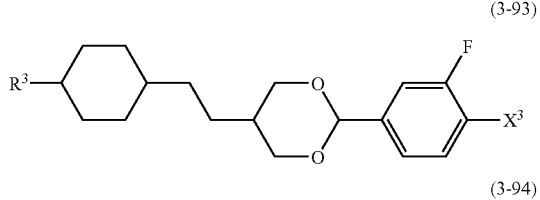
(3-94)
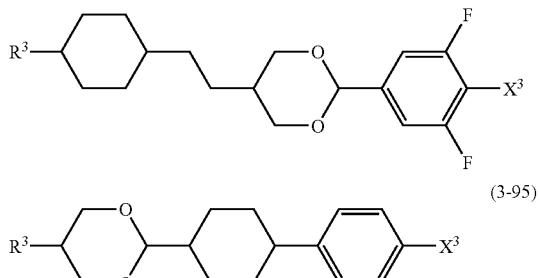
(3-95)
(3-96)
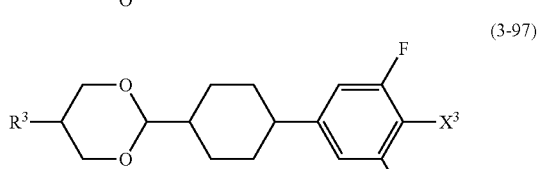
(3-97)
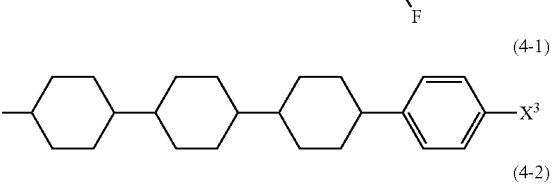
(4-1)
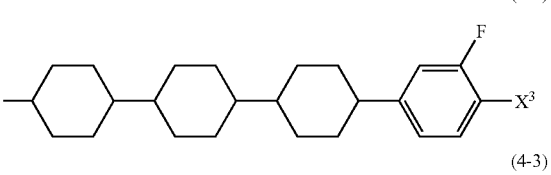
(4-2)
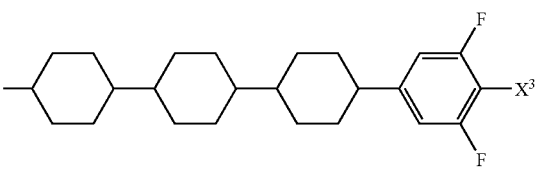
(4-3)
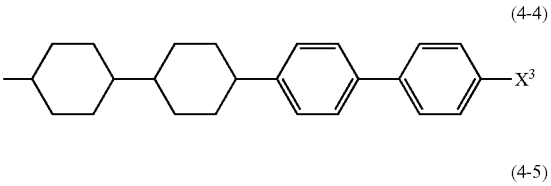
(4-4)
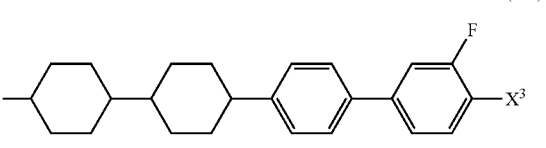
(4-5)

-continued

-continued
(4-24)
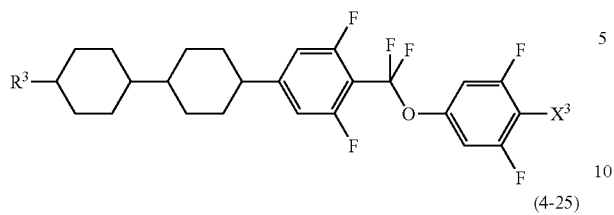
(4-25)
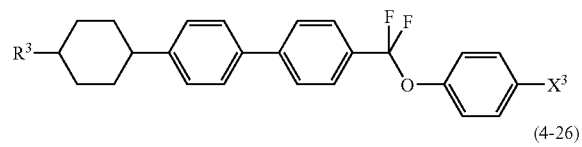
(4-26)
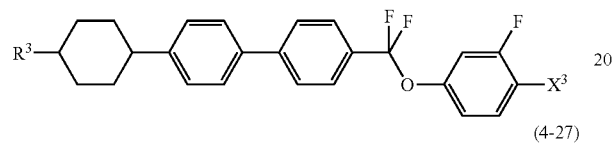
(4-27)
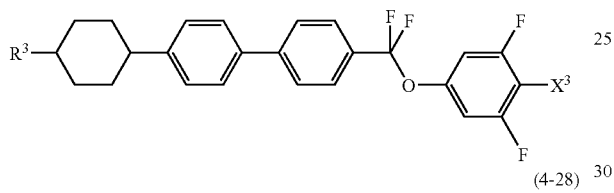
(4-28)
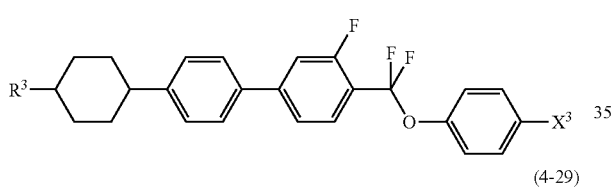
(4-29)
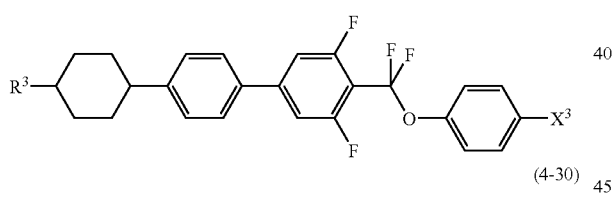
(4-30)
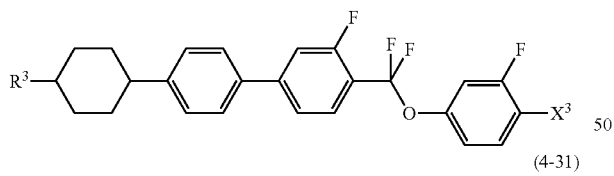
(4-31)
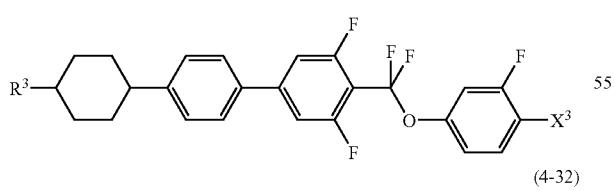
(4-32)
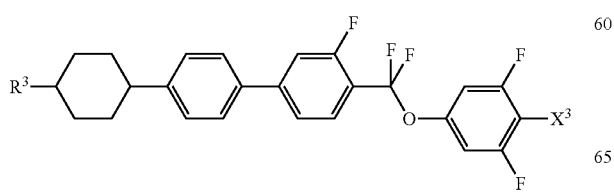
-continued
(4-33)
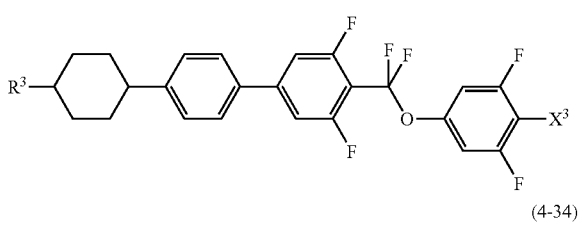
(4-34)
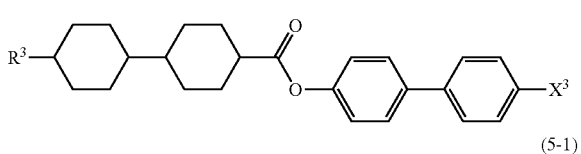
(5-1)
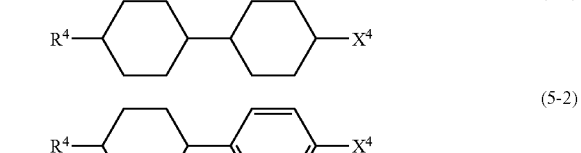
(5-2)
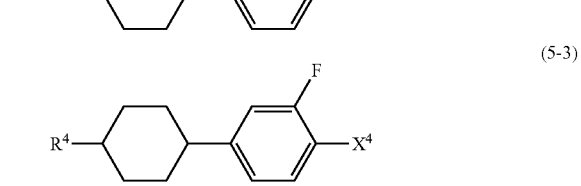
(5-3)
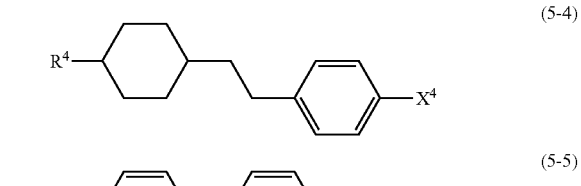
(5-4)
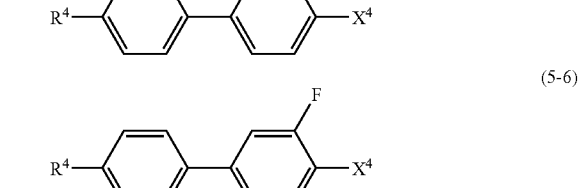
(5-5)
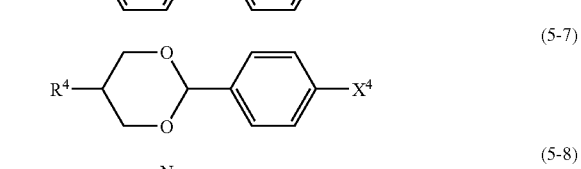
(5-6)
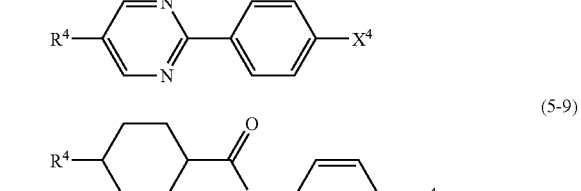
(5-7)
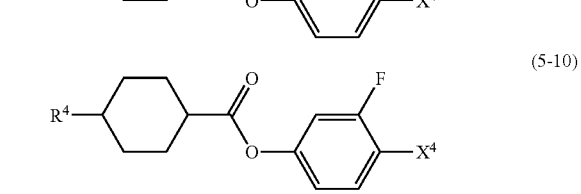
(5-8)
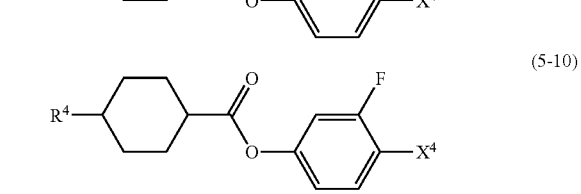
(5-9)
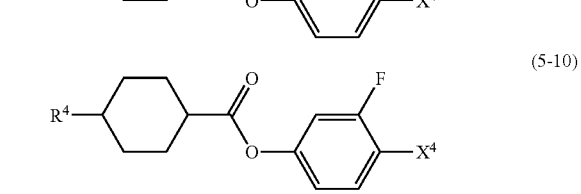
(5-10)

-continued
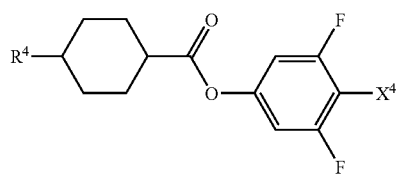
(5-11)
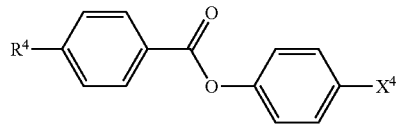
(5-12)
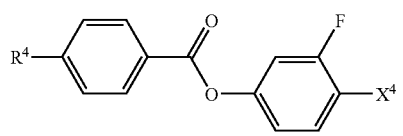
(5-13)
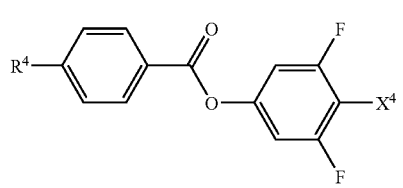
(5-14)
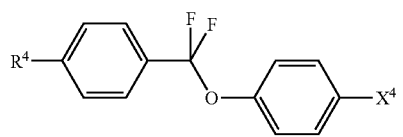
(5-15)
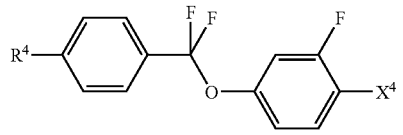
(5-16)
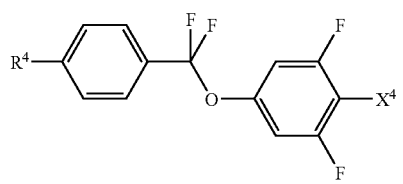
(5-17)
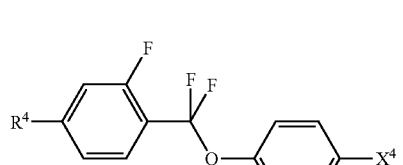
(5-18)
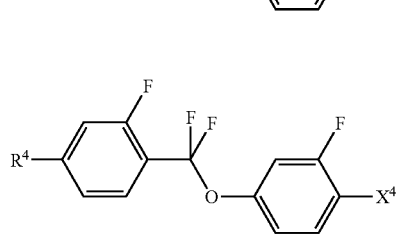
(5-19)
-continued
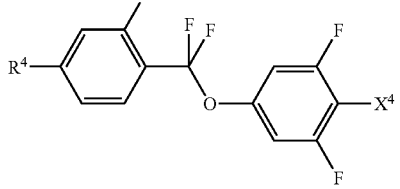
(5-20)
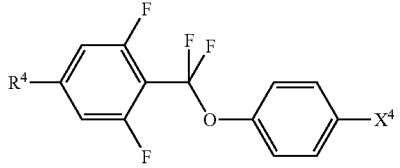
(5-21)
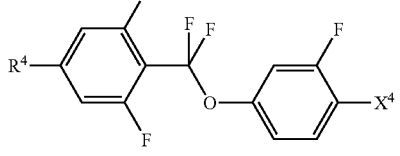
(5-22)
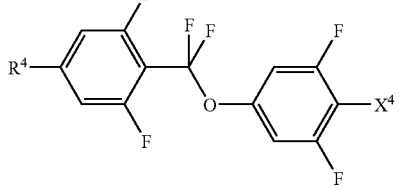
(5-23)
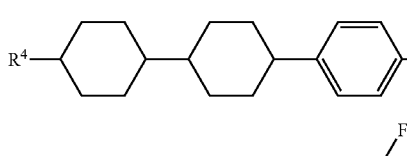
(5-24)
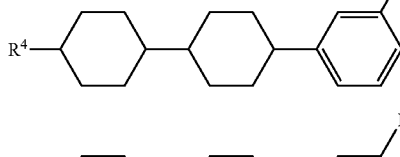
(5-25)
(5-26)
(5-27)
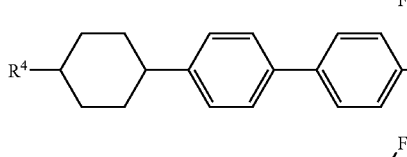
(5-28)
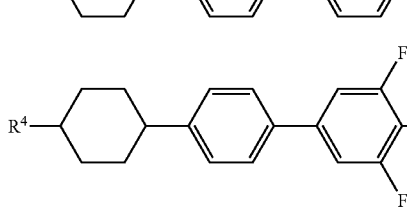
(5-29)

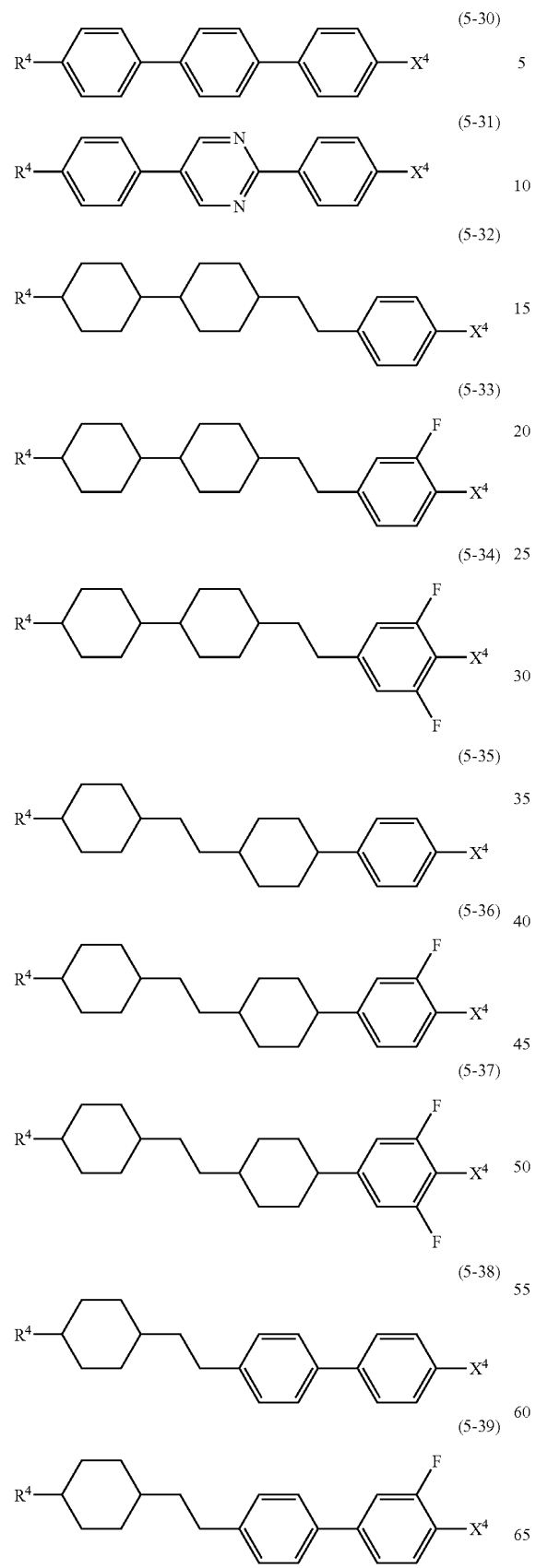
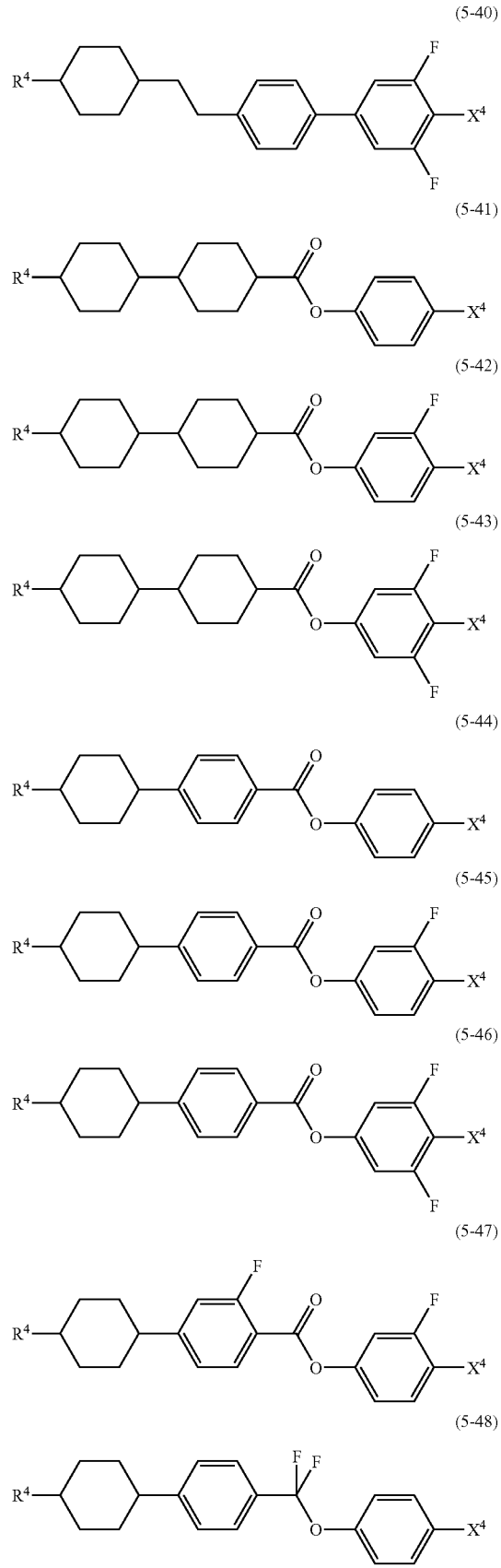

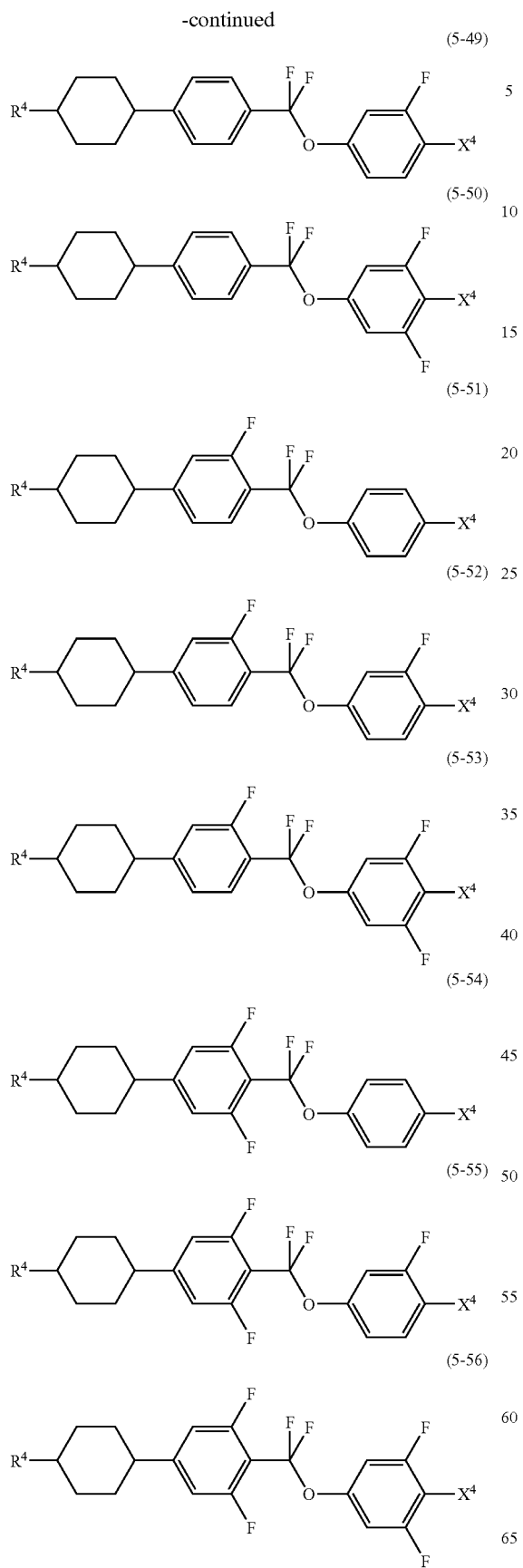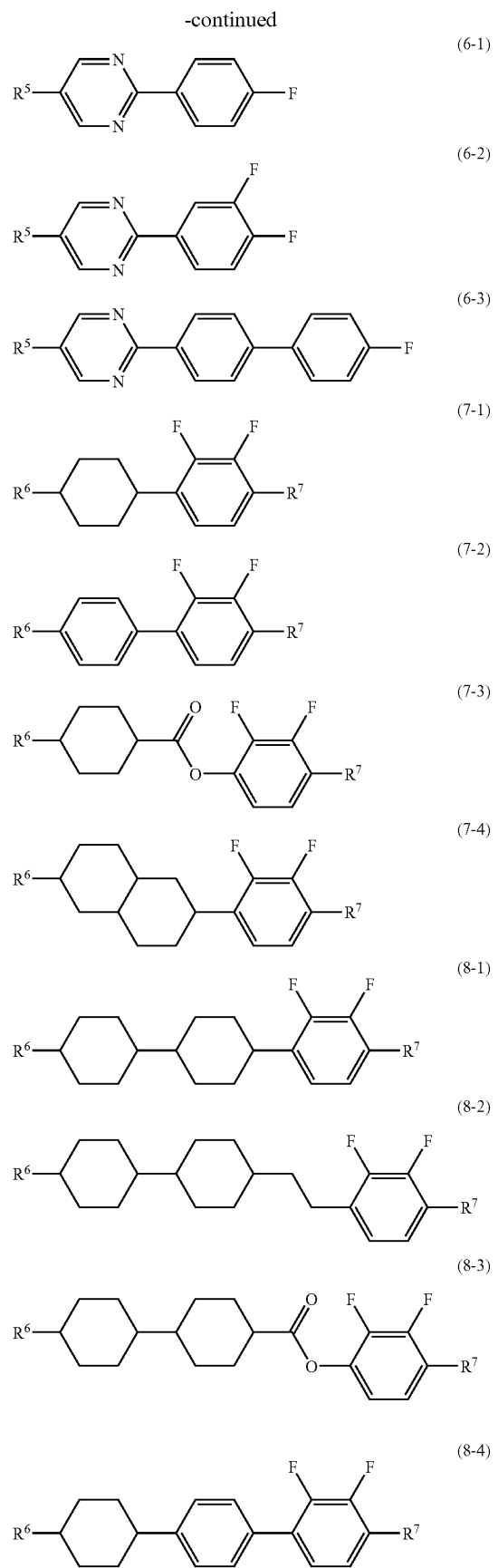

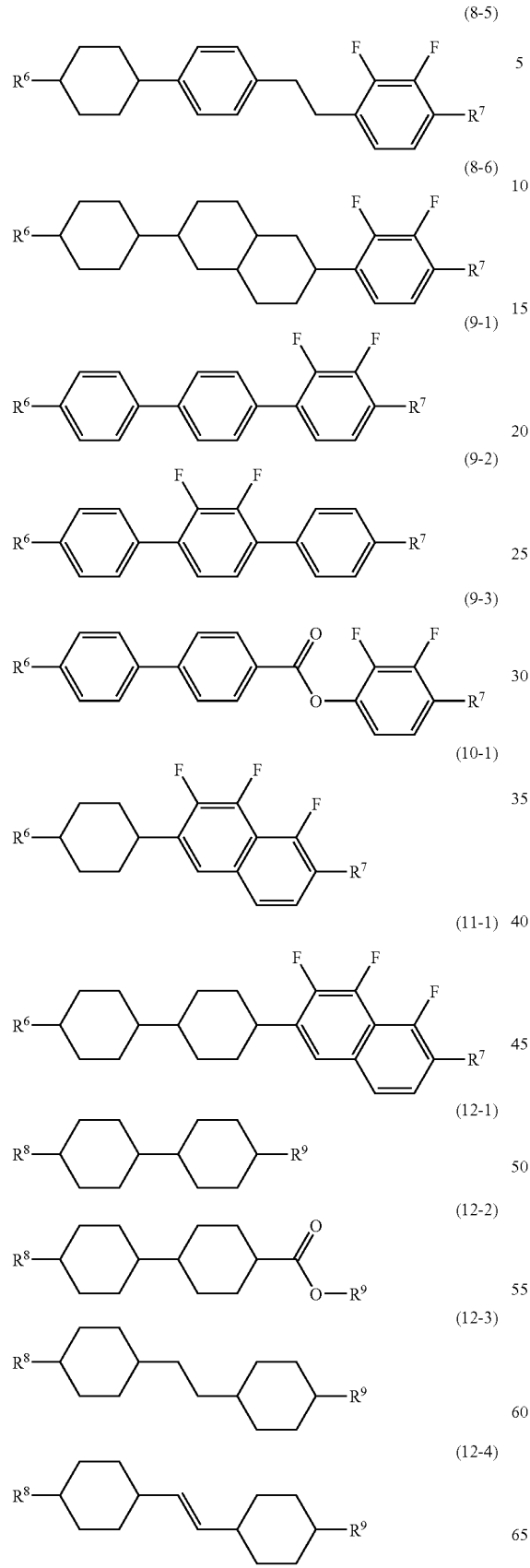
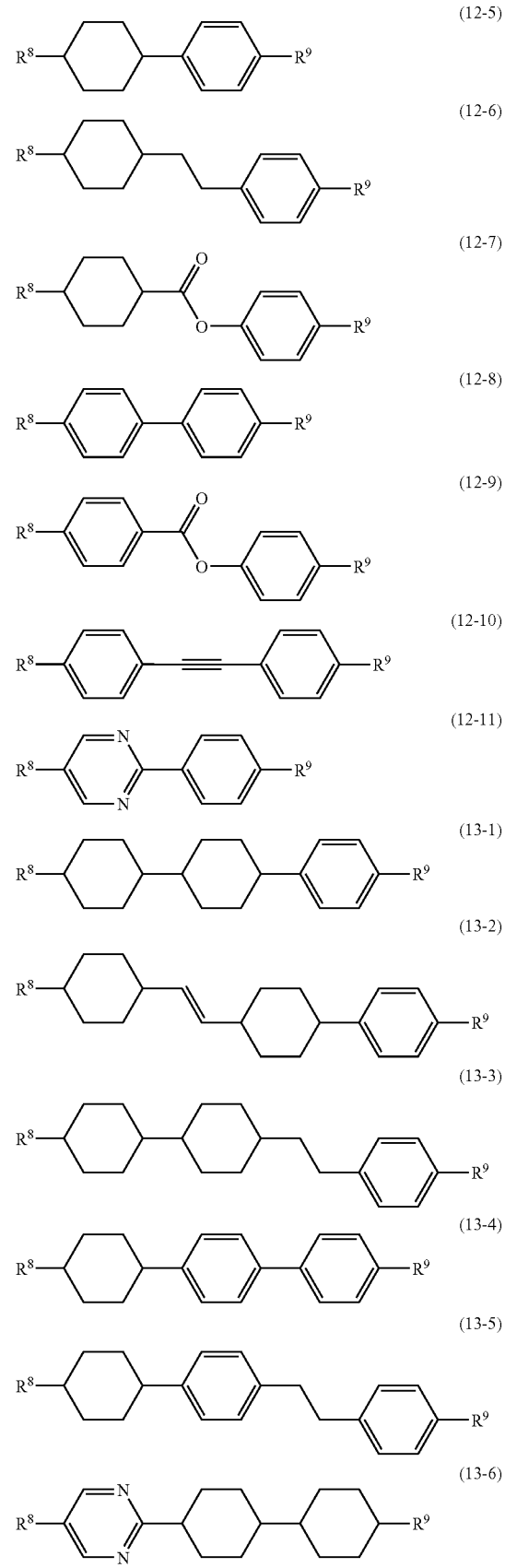

-continued
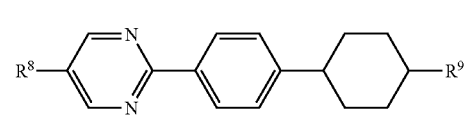
(13-7)
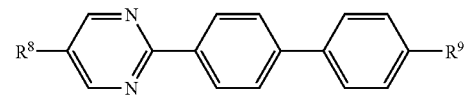
(13-8)
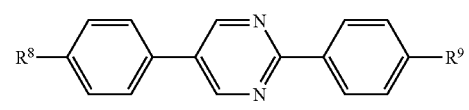
(13-9)
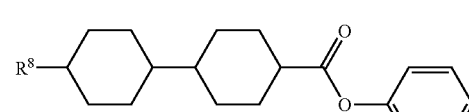
(13-10)
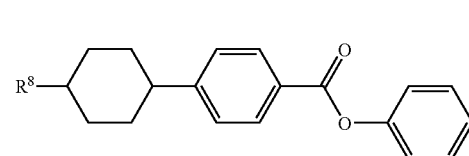
(13-11)
(13-12)
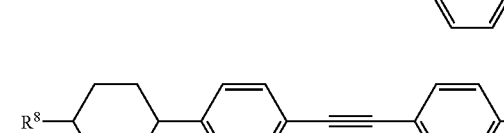
(13-13)
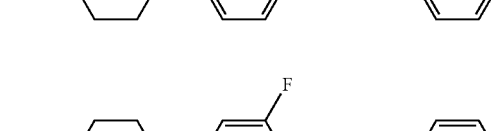
(13-14)
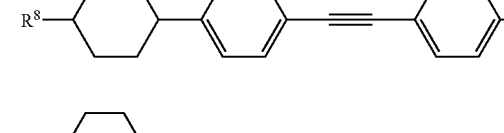
(13-15)
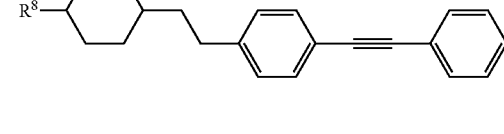
(13-16)
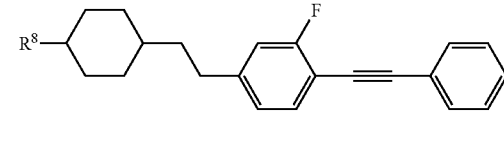
(13-17)
-continued
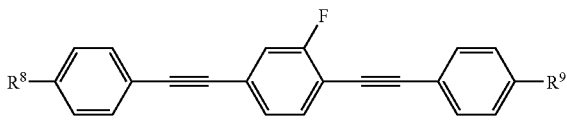
(13-18)
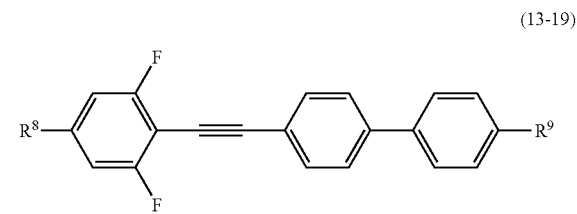
(13-19)
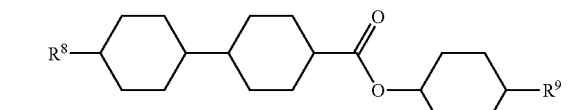
(13-20)
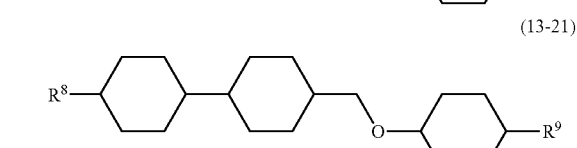
(13-21)
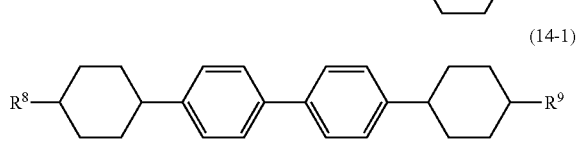
(14-1)
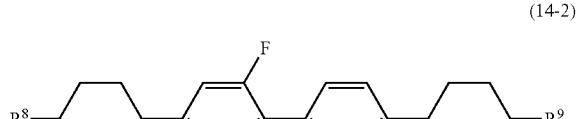
(14-2)
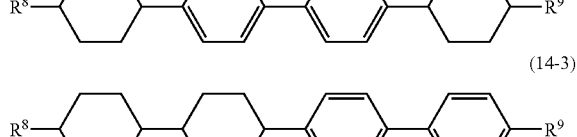
(14-3)
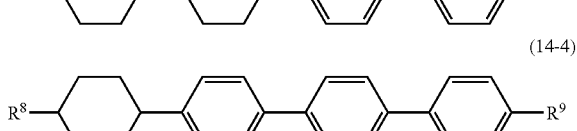
(14-4)
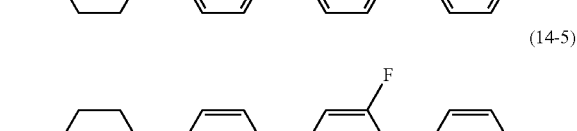
(14-5)
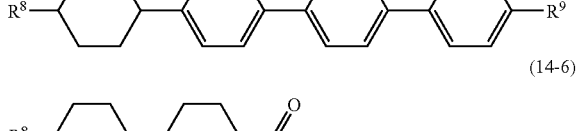
(14-6)
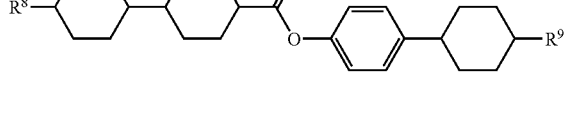
The liquid crystal composition of the invention can be prepared, for example, by mixing and heating liquid crystal compounds as components. The liquid crystal composition of the invention may be prepared in other methods. An additive may be added to the liquid crystal composition of the invention to control the properties of the liquid crystal composition.

For example, in the case where the liquid crystal composition of the invention is used in a liquid crystal display device driven in a guest-host (GH) mode, a dichroic dye is added to the liquid crystal composition of the invention. Examples of the dichroic dye include a merocyanine dye, a styryl dye, an azo dye, an azomethine dye, an azoxy dye, a quinophthalone dye, an anthraquinone dye and a tetrazine dye.

In the case where a helical structure is induced in the liquid crystal to provide a necessary twist angle, a chiral dopant is added to the liquid crystal composition of the invention. Examples of the chiral dopant include compounds represented by formulas (Op-1) to (Op-13).

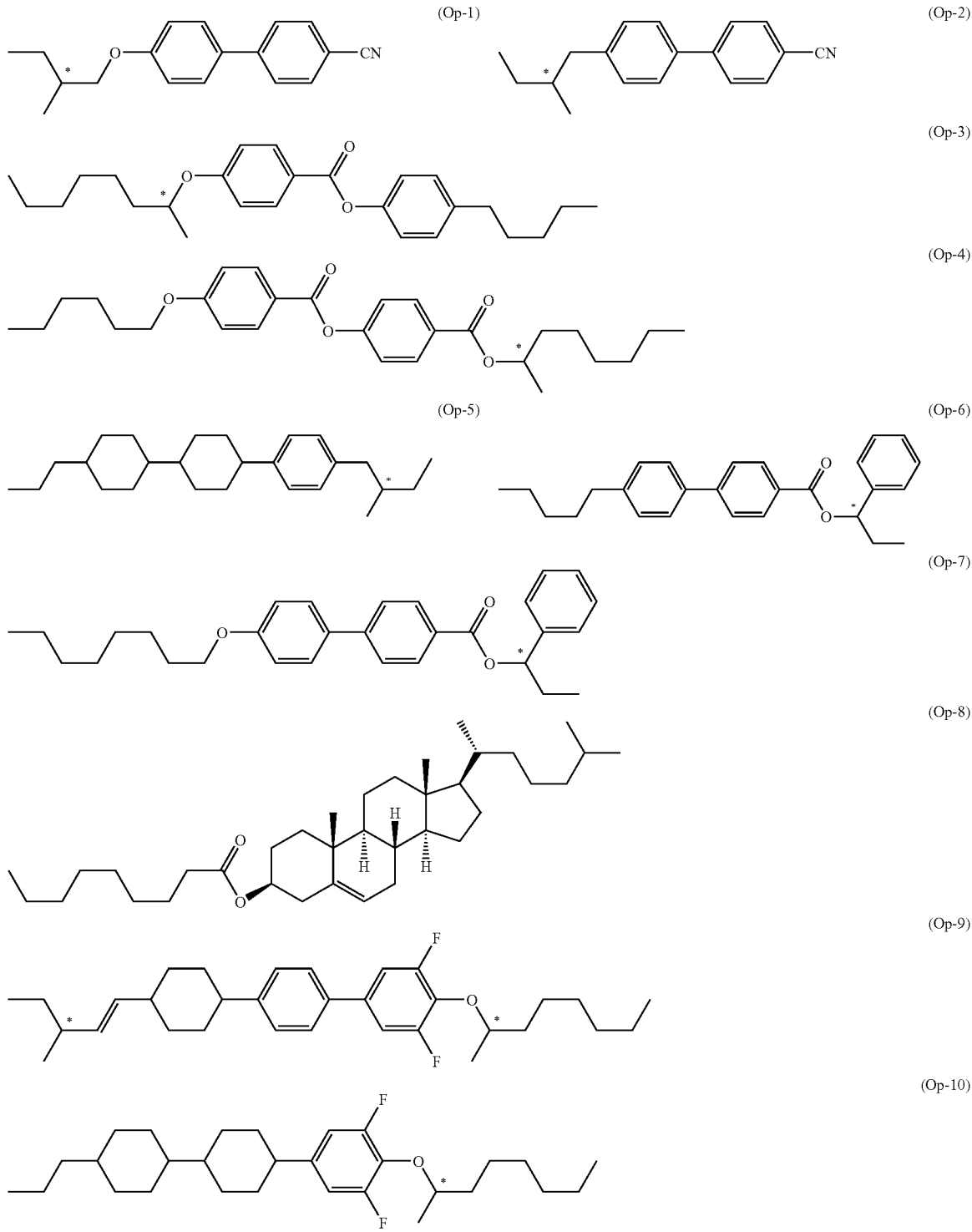

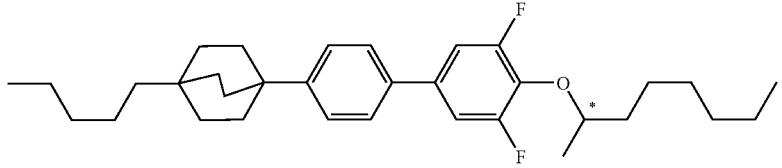
(Op-11)

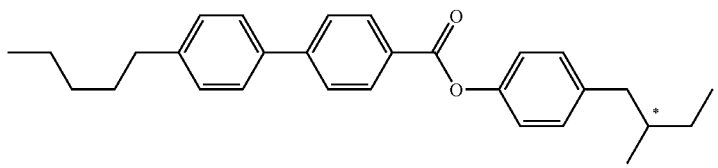
(Op-12)

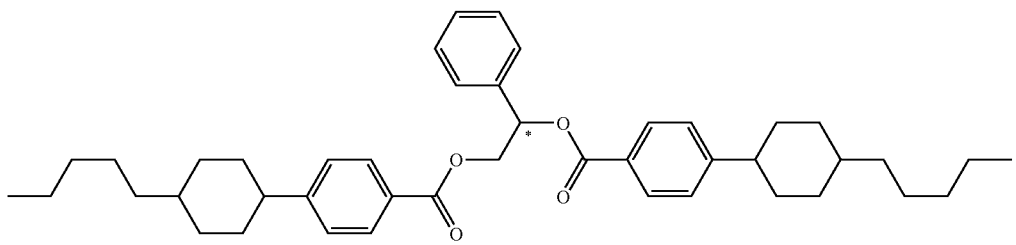
(Op-13)

When a chiral dopant is added to the liquid crystal composition, the pitch of the helical structure of the liquid crystal can be controlled. A liquid crystal composition used in a liquid crystal display device driven in a TN mode (such as a TFT display device) preferably has a pitch in a range of from 40 μm to 200 μm. A liquid crystal composition used in a liquid crystal display device driven in an STN mode preferably has a pitch in a range of from 6 μm to 20 μm. A liquid crystal composition used in a liquid crystal display device driven in a BTN mode preferably has a pitch in a range of from 1.5 μm to 4 μm. In a liquid crystal composition used in a liquid crystal display device driven in a PC mode, a relatively large amount of a chiral dopant is added.

Two or more of the chiral dopants may be added to the liquid crystal composition for the purpose of controlling the temperature dependency of the pitch and so forth.

Known additives may be added to the liquid crystal composition of the invention for the purpose of controlling the properties.

The liquid crystal composition of the invention can be used in a liquid crystal display device driven in such a mode as PC, TN, STN, BTN, ECB, OCB, IPS, VA and so forth. The driving mode of the liquid crystal display device may be PM or AM. The liquid crystal composition of the invention can be used as an NCAP (nematic curvilinear aligned phase) device prepared by microcapsulating the liquid crystal composition, and as a PD (polymer dispersed) device having a three-dimensional network polymer formed in the liquid crystal composition, for example, a PN (polymer network) device.

EXAMPLES

The invention will be described in more detail with reference to examples below, but the invention is not construed as being limited to the examples. The resulting compounds are identified by NMR spectra, mass spectra and so forth. The measurement methods therefor are described below.

$^1$H-NMR Analysis:

The measurements were carried out by using DRX-500 (produced by Bruker Biospin Co., Ltd.) used as a nuclear magnetic resonance apparatus. A sample was dissolved in a deuterated solvent capable of dissolving the sample (such as $CDCl_3$), and the measurement was carried out at room temperature. Tetramethylsilane (TMS) was used as a standard substance indicating zero point of chemical shift δ.

Gas Chromatography Analysis:

Gas Chromatograph Model GC-14B (made by Shimadzu Corporation) was used for the measurement. Helium (2 mL/min) was used as a carrier gas. The sample evaporating chamber was set at 280° C., and the detector (FID) was set at 300° C. Capillary column DB-1 (length 30 m, bore 0.32 mm, film thickness 0.25 μm, dimethylpolysiloxane as stationary phase, no polarity) made by Agilent Technologies, Inc. was used as the measurement column. A sample was dissolved in acetone to prepare a measurement solution of 0.1% by mass. 1 μl of the solution was injected in the evaporating chamber. The measurement was carried out by maintaining the column at 180° C. for 2 minutes and increasing the temperature thereof to 280° C. at a rate of 5° C. per minute. The measurement result was recorded with Chromatopac Model C-R5A (made by Shimadzu Corporation) or an equivalent thereof and was obtained as a chromatogram. The resulting chromatogram showed a retention time of a peak and a peak area corresponding to the compound contained in the sample.

Example 1

4''-(3-Butenyl)-4-ethyl-2''-fluoro-[1,1'; 4',1'']terphenyl (1-1-2) was produced according to the synthesis scheme shown below.

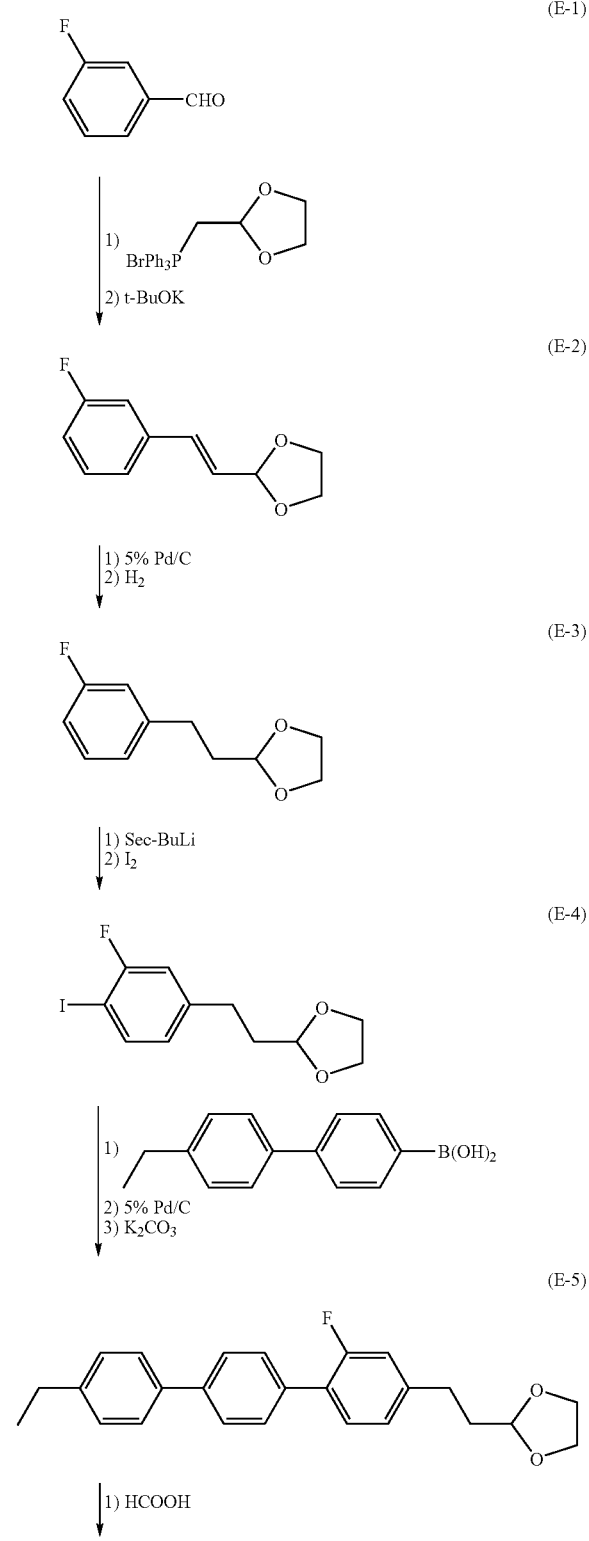

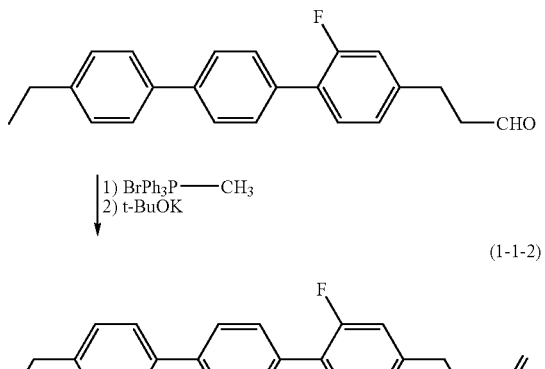

Production of 2-[2-(3-fluorophenyl)vinyl]-[1,3]dioxolane (E-2)

A suspension liquid of 8.3 g (19.3 mmol) of dioxolan-2-yl methyltriphenyl phosphonium bromide and 30 mL of THF was cooled to −30° C. 2.2 g (19.3 mmol) of t-BuOK was added to the suspension liquid. After stirring at −30° C. for 15 minutes, a solution of 2.0 g (16.1 mmol) of the compound (E-1) dissolved in 10 mL of THF was added dropwise thereto at a temperature maintained at −30° C. After stirring at −30° C. for 5 hours, the resulting solution was increased in temperature to 0° C., to which 30 mL of water was added dropwise. After extracting with 50 mL of toluene, the toluene extract was washed with water. After drying over anhydrous magnesium sulfate, the solvent was distilled off from the extract under reduced pressure to obtain 11.2 g of a residue. The residue was purified by silica gel column chromatography (eluent: toluene) to obtain 2.7 g of the compound (E-2).

Production of 2-[2-(3-fluorophenyl)ethyl]-[1,3]dioxolane (E-3)

A mixture of 2.7 g (13.9 mmol) of the compound (E-2) obtained above, 0.3 g of 5%-Pd/C and 30 mL of toluene was reacted by stirring under a hydrogen atmosphere for 6 hours. After completing the reaction, the catalyst was removed by filtration, and the solvent was distilled off from the resulting reaction solution under reduced pressure to obtain 2.8 g of a residue. The residue was purified by silica gel column chromatography (eluent: toluene) to obtain 2.6 g of the compound (E-3).

Production of 2-[2-(3-fluoro-4-iodophenyl)ethyl]-[1,3]dioxolane (E-4)

14.6 mL (14.6 mmol) of sec-BuLi was added dropwise to a solution of 2.6 g (13.3 mmol) of the compound (E-3) obtained above dissolved in 30 mL of THF at a temperature maintained at −60° C. After stirring at −60° C. for 1 hour, a solution of 3.9 g (15.2 mmol) of iodine dissolved in 25 mL of THF was added dropwise to the reaction solution at a temperature maintained at −60° C. After stirring at −60° C. for 30 minutes, the resulting solution was increased in temperature to 0° C., to which 15 mL of water was added dropwise. After extracting with 30 mL of toluene, the toluene extract was washed with a dilute sodium thiosulfate solution and water.

The solution was dried over anhydrous magnesium sulfate, and the solvent was distilled off from the extract under reduced pressure to obtain 3.3 g of the compound (E-4).

Production of 2-[2-(4"-ethyl-2-fluoro-[1,1'; 4',1"]terphenyl-4-yl)ethyl)-[1,3]dioxolane (E-5)

A mixture of 3.3 g (10.2 mmol) of the compound (E-4) obtained above, 2.8 g (12.3 mmol) of 4'-ethylbiphenyl-4-yl dihydroxyborane, 3.2 g (15.4 mmol) of potassium carbonate, 0.2 g of 5%-Pd/C and 50 mL of a mixed solvent of toluene, ethanol and water (ratio: 1/1/1) was refluxed for 6 hours to obtain a reaction solution. After removing the catalyst by filtration, 50 mL of toluene was added to the reaction solution, which was then washed with water. The reaction solution having been washed with water was dried over anhydrous magnesium sulfate, and the solvent was distilled off from the reaction solution under reduced pressure to obtain 6.4 g of a residue. The residue was purified by silica gel column chromatography (eluent: toluene/ethyl acetate=15/1) to obtain 3.1 g of crude crystals of the compound (E-5). The crude crystals were dissolved in a mixed solvent of ethanol and ethyl acetate (ratio: 8/2) and recrystallized therefrom to obtain 2.4 g of purified crystals of the compound (E-5).

Production of 3-(4"-ethyl-2-fluoro-[1,1'; 4',1"]terphenyl-4-yl)-propionaldehyde (E-6)

A mixture of 2.4 g (6.4 mmol) of the compound (E-5) obtained above, 15 mL of formic acid and 50 mL of toluene was refluxed for 3 hours to obtain a reaction solution. 30 mL of water was added to the reaction solution for washing. The reaction solution having been washed with water was further washed with a dilute sodium hydrogencarbonate solution and water. The solution was dried over anhydrous magnesium sulfate, and the solvent was distilled off from the solution under reduced pressure to obtain 1.9 g of the compound (E-6)

Production of 4"-(3-butenyl)-4-ethyl-2"-fluoro-[1,1'; 4',1"]terphenyl (1-1-2)

A suspension liquid of 2.5 g (7.1 mmol) of methyltriphenylphosphonium bromide and 20 mL of THF was cooled to −10° C. 0.8 g (7.1 mmol) of t-BuOK was added to the suspension liquid. After stirring at −10° C. for 1 hour, a solution of 1.9 g (5.7 mmol) of the compound (E-6) obtained above dissolved in 10 mL of THF was added dropwise thereto at a temperature maintained at −10° C. After stirring the resulting solution at −10° C. for 1 hour, 20 mL of dilute hydrochloric acid was added dropwise thereto. After extracting with 50 mL toluene, the toluene extract was washed with water. After drying over anhydrous magnesium sulfate, the solvent was distilled off from the extract under reduced pressure to obtain 5.2 g of a residue. The residue was purified by silica gel column chromatography (eluent: heptane/toluene=4/1) to obtain 1.7 g of crude crystals of the compound (E-7). The crude crystals were dissolved in a mixed solvent of ethanol and ethyl acetate (ratio: 9/1) and recrystallized therefrom to obtain 1.2 g of purified crystals of the compound (1-1-2). The phase transition temperatures thereof were C 90.9 N 144.3 Iso.

The properties of the compound (1-1-2) were obtained in such a manner that a sample was prepared by mixing 15% by mass of the compound and 85% by mass of the mother crystals, and the properties were calculated from the values obtained by the measurement through an extrapolation method.

Extrapolated Value=((measured value of sample)−0.85×(measured value of mother liquid crystals))/0.15

The properties of the compound were NI=109.7° C., Δ∈=7.4, Δn=0.257, η=19.7 mPa·s.

Example 2

4"-(3-Butenyl)-4-ethyl-3"-fluoro-[1,1'; 4',1"]terphenyl (1-2-2) was produced according to the synthesis scheme shown below.

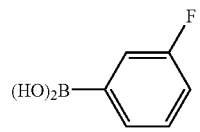

(E-7)

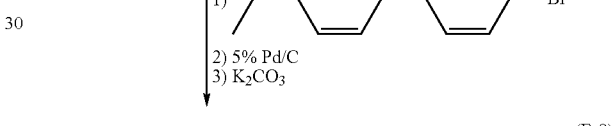

(E-8)

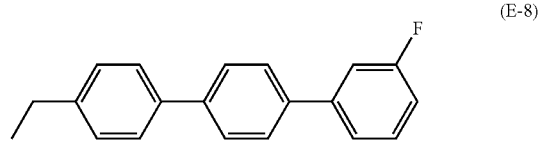

(E-9)

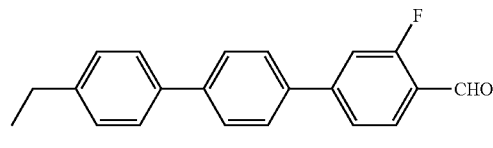

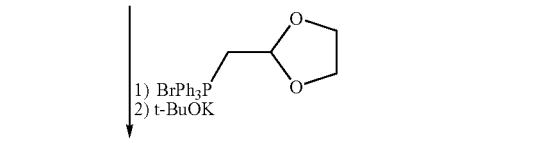

(E-10)

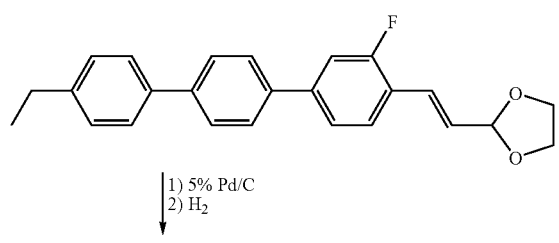

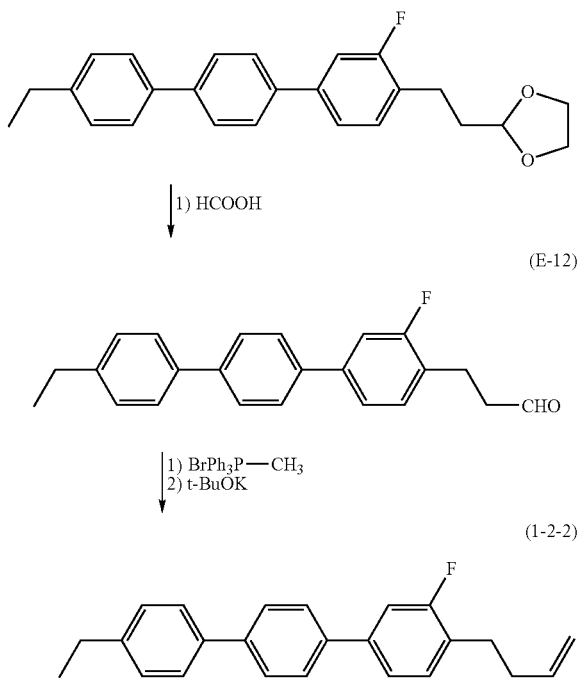

Production of 4"-ethyl-3-fluoro-[1,1'; 4',1"]terphenyl (E-8)

A mixture of 5.6 g (21.4 mmol) of 4-bromo-4'-ethylbiphenyl, 3.6 g (25.7 mmol) of 3-fluorophenyl dihydroxyborane, 4.4 g (32.2 mmol) of potassium carbonate, 0.3 g of 5%-Pd/C and 60 mL of a mixed solvent of toluene, ethanol and water (ratio: 1/1/1) was refluxed for 6 hours to obtain a reaction solution. After removing the catalyst by filtration, 50 mL of toluene was added to the reaction solution, which was then washed with water. The reaction solution having been washed with water was dried over anhydrous magnesium sulfate, and the solvent was distilled off from the reaction solution under reduced pressure to obtain 8.6 g of a residue. The residue was purified by silica gel column chromatography (eluent: heptane/toluene=4/1) to obtain 5.1 g of crude crystals of the compound (E-8). The crude crystals were dissolved in a mixed solvent of ethanol and ethyl acetate (ratio: 10/1) and recrystallized therefrom to obtain 4.5 g of purified crystals of the compound (E-8).

Production of 4"-ethyl-3-fluoro-[1,1'; 4',1"]terphenyl-4-carboaldehyde (E-9)

17.9 mL (17.9 mmol) of sec-BuLi was added dropwise to a solution of 4.5 g (16.3 mmol) of the compound (E-8) obtained above dissolved in 50 mL of THF at a temperature maintained at −60° C. After stirring at −60° C. for 1 hour, a solution of 1.37 g (18.7 mmol) of dimethylformamide dissolved in 10 mL of THF was added dropwise thereto at a temperature maintained at −60° C. or less. After stirring at −60° C. for 30 minutes, the resulting solution was increased in temperature to 0° C., to which 15 mL of dilute hydrochloric acid was added dropwise. After extracting with 30 mL of toluene, the toluene extract was washed with a dilute sodium hydrogencarbonate solution and water. After drying over anhydrous magnesium sulfate, the solvent was distilled off from the extract under reduced pressure to obtain 4.6 g of a residue. The residue was purified by silica gel column chromatography (eluent: toluene/ethyl acetate=20/1) to obtain 3.6 g of the compound (E-9).

Production of 2-[2-(4"-ethyl-3-fluoro-[1,1'; 4',1"]terphenyl-4-yl)vinyl)-[1,3]dioxolane (E-10)

A suspension liquid of 6.1 g (14.2 mmol) of dioxolan-2-yl methyltriphenylphosphonium bromide and 30 mL of THF was cooled to −30° C. 1.6 g (14.2 mmol) of t-BuOK was added to the suspension liquid. After stirring at −30° C. for 15 minutes, a solution of 3.6 g (11.8 mmol) of the compound (E-9) obtained above dissolved in 20 mL of THF was added dropwise thereto at a temperature maintained at −30° C. or less. After stirring at −30° C. for 5 hours, the resulting solution was increased in temperature to 0° C., to which 30 mL of water was added dropwise. After extracting with 50 mL of toluene, the toluene extract was washed with water. After drying over anhydrous magnesium sulfate, the solvent was distilled off from the extract under reduced pressure to obtain 10.6 g of a residue. The residue was purified by silica gel column chromatography (eluent: toluene) to obtain 3.9 g of the compound (E-10).

Production of 2-[2-(4"-ethyl-3-fluoro-[1,1'; 4',1"]terphenyl-4-yl)ethyl)-[1,3]dioxolane (E-11)

A mixture of 3.9 g (10.4 mmol) of the compound (E-10) obtained above, 0.3 g of 5%-Pd/C and 50 mL of toluene was reacted under a hydrogen atmosphere under stirring for 6 hours. After completing the reaction, the catalyst was removed by filtration, and the solvent was distilled off from the reaction solution under reduced pressure to obtain 3.7 g of a residue. The residue was purified by silica gel column chromatography (eluent: toluene) to obtain 3.5 g of the compound (E-11).

Production of 3-(4"-ethyl-3-fluoro-[1,1'; 4',1"]terphenyl-4-yl)-propionaldehyde (E-12)

2.8 g of the compound (E-12) was obtained according to the production method of the compound (E-6) described above.

Production of 4"-(3-butenyl)-4-ethyl-3"-fluoro-[1,1'; 4',1"]terphenyl (1-2-2)

1.6 g of the compound (1-2-2) was obtained according to the production method of the compound (1-1-2). The phase transition temperatures thereof were C 90 $S_E$ 124.4 $S_B$ 155.3 $S_A$ 187.6 Iso.

The properties of the compound (1-2-2) were obtained in such a manner that a sample was prepared by mixing 15% by mass of the compound and 85% by mass of the mother crystals, and the properties were calculated from the values obtained by the measurement through an extrapolation method.

Extrapolated Value=((measured value of sample)−0.85×(measured value of mother liquid crystals))/0.15

The properties of the compound were NI=132.7° C., $\Delta\epsilon$=6.4, $\Delta n$=0.267, $\eta$=20.0 mPa·s.

The properties of the compounds are shown in Table 1. The properties were measured in the same manner as in Example 1.

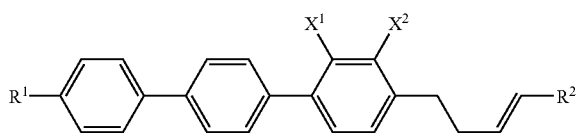

(1)

In Table 1, the meanings of $R^1$, $R^2$, $X^1$ and $X^2$ are the same as those in the compound (1).

TABLE 1

| NO. | $R^1$ | $R^2$ | $X^1$ | $X^2$ | |
|---|---|---|---|---|---|
| 1-1-0 | H | H | F | H | |
| 1-1-1 | —CH$_3$ | H | F | H | |
| 1-1-2 | —C$_2$H$_5$ | H | F | H | NI = 109.7° C., Δε = 7.4, Δn = 0.257, η = 19.7 mPa·s, C 90.9 N 144.3 Iso |
| 1-1-3 | —C$_3$H$_7$ | H | F | H | |
| 1-1-4 | —C$_4$H$_9$ | H | F | H | |
| 1-1-5 | —C$_5$H$_{11}$ | H | F | H | |
| 1-2-0 | H | H | H | F | |
| 1-2-1 | —CH$_3$ | H | H | F | |
| 1-2-2 | —C$_2$H$_5$ | H | H | F | NI = 132.7° C., Δε = 6.4, Δn = 0.267, η = 20.0 mPa·s, C 90 S$_E$ 124.4 S$_B$ 155.3 S$_A$ 187.6 Iso |
| 1-2-3 | —C$_3$H$_7$ | H | H | F | |
| 1-2-4 | —C$_4$H$_9$ | H | H | F | |
| 1-2-5 | —C$_5$H$_{11}$ | H | H | F | |
| 1-3-0 | H | E-CH$_3$ | F | H | |
| 1-3-1 | —CH$_3$ | E-CH$_3$ | F | H | |
| 1-3-2 | —C$_2$H$_5$ | E-CH$_3$ | F | H | |
| 1-3-3 | —C$_3$H$_7$ | E-CH$_3$ | F | H | |
| 1-3-4 | —C$_4$H$_9$ | E-CH$_3$ | F | H | |
| 1-3-5 | —C$_5$H$_{11}$ | E-CH$_3$ | F | H | |
| 1-4-0 | H | E-CH$_3$ | H | F | |
| 1-4-1 | —CH$_3$ | E-CH$_3$ | H | F | |
| 1-4-2 | —C$_2$H$_5$ | E-CH$_3$ | H | F | |
| 1-4-3 | —C$_3$H$_7$ | E-CH$_3$ | H | F | |
| 1-4-4 | —C$_4$H$_9$ | E-CH$_3$ | H | F | |
| 1-4-5 | —C$_5$H$_{11}$ | E-CH$_3$ | H | F | |
| 1-5-0 | H | Z-CH$_3$ | F | H | |
| 1-5-1 | —CH$_3$ | Z-CH$_3$ | F | H | |
| 1-5-2 | —C$_2$H$_5$ | Z-CH$_3$ | F | H | |
| 1-5-3 | —C$_3$H$_7$ | Z-CH$_3$ | F | H | |
| 1-5-4 | —C$_4$H$_9$ | Z-CH$_3$ | F | H | |
| 1-5-5 | —C$_5$H$_{11}$ | Z-CH$_3$ | F | H | |
| 1-6-0 | H | Z-CH$_3$ | H | F | |
| 1-6-1 | —CH$_3$ | Z-CH$_3$ | H | F | |
| 1-6-2 | —C$_2$H$_5$ | Z-CH$_3$ | H | F | |
| 1-6-3 | —C$_3$H$_7$ | Z-CH$_3$ | H | F | |
| 1-6-4 | —C$_4$H$_9$ | Z-CH$_3$ | H | F | |
| 1-6-5 | —C$_5$H$_{11}$ | Z-CH$_3$ | H | F | |

An example of the representative compositions of the invention is shown below. The measurement methods of the properties are shown later.

Composition Example 1

Four compounds were mixed to prepare a liquid crystal composition A (mother liquid crystals) having a nematic phase. The four compounds were 4-(4-propylcyclohexyl)benzonitrile (24%), 4-(4-pentylcyclohexyl)benzonitrile (36%), 4-(4-heptylcyclohexyl)benzonitrile (25%) and 4-(4-pentylcyclohexyl)-4'-cyanobiphenyl (15%).

The properties of the liquid crystal composition A were maximum temperature (NI)=71.7° C., viscosity (η$_{20}$)=27.0 mPa·s, refractive index anisotropy (Δn)=0.137, and dielectric anisotropy (Δε)=11.0.

15% by mass of 4"-(3-butenyl)-4-ethyl-2"-fluoro-[1,1'; 4',1"]terphenyl (1-1-2) in Example 1 was added to the liquid crystal composition A, and the resulting composition was measured for properties. As a result, the properties of the composition were maximum temperature (NI)=80.3° C., refractive index anisotropy (Δn)=0.155, and dielectric anisotropy (Δε)=10.8.

Comparative Example 1

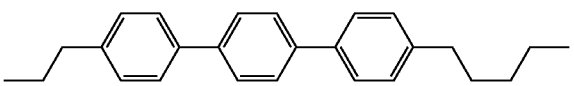

(C-1)

The known compound (C-1) is disclosed in Mol. Cryst. Liq. Cryst., 123, 185 (1985), Mol. Cryst. Liq. Cryst 366, 125 (2001) and EP 0132377A, and the phase transition temperatures thereof were C 180 S$_E$ 200 S$_B$ 214 S$_A$ 218 Iso. As being expected from the structure of the compound (C-1), the melting point thereof is as high as 180° C. In the case where a terphenyl compound having alkyls as both end groups like the compound (C-1) is contained in a liquid crystal composition used in a liquid crystal display device, it is expected that the liquid crystal composition is largely increased in viscosity and is inferior in compatibility since the compound is deposited as crystals or a smectic phase at a low temperature. Accordingly, the compound (C-1) and the compound (1) of the invention are in significant contrast to each other.

Comparative Example 2

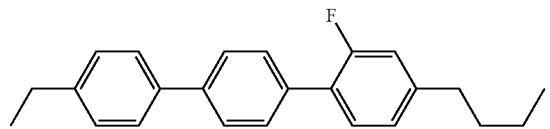

(C-2)

A liquid crystal composition containing 85% of the liquid crystal composition A in Example 1 and 15% of the compound (C-2) was prepared, and the properties thereof were calculated from the values obtained by the measurement through an extrapolation method. The properties of the composition were NI=109.7° C., Δε=5.6, Δn=0.230, and η=27.8 mPa·s. The values were low in NI, small in refractive index anisotropy and large in viscosity, as compared to the properties of the compound (1-1-2).

Comparative Example 3

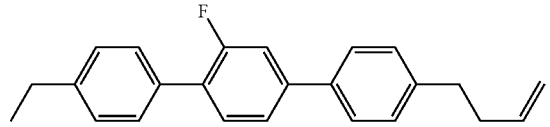

(C-3)

A liquid crystal composition containing 85% of the liquid crystal composition A in Example 1 and 15% of the compound (C-3) disclosed in JP H11-43450 A/1999 was prepared, and the properties thereof were calculated from the values obtained by the measurement through an extrapolation method. The properties of the composition were NI=121.7° C., Δ∈=6.3, Δn=0.250, and η=19.7 mPa·s. The values were low in NI and small in refractive index anisotropy while being equivalent in viscosity, as compared to the properties of the compound (1-1-2).

Comparative Example 4

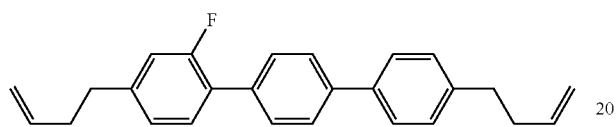
(C-4)

A liquid crystal composition containing 85% of the liquid crystal composition A in Example 1 and 15% of the compound (C-4) disclosed in JP 2001-11456 A/2001 was prepared, and the properties thereof were measured. As being expected from the structure of the compound (C-4), the compound (C-4) had strong smectic property to cause deposition of crystals or a smectic phase thereof at a low temperature.

Representative examples of the liquid crystal composition of the invention are summarized in Composition Examples 2 to 17. Firstly, the compounds as the components of the liquid crystal compositions and the amounts (percent by mass) thereof are shown. The compounds are shown in terms of symbols of the left-hand end group, the position of fluorine and the right-hand end group according to the definitions in Table 2. The case with no symbol for the end group means that the end group is hydrogen. The properties of the liquid crystal compositions are then shown.

TABLE 2

| Method of Description of Compound using Symbols | |
|---|---|
| 1) Left Terminal Group R— | Symbol |
| $C_nH_{2n+1}$— | n- |
| $C_nH_{2n+1}OC_mH_{2m}$— | nOm- |
| $CH_2=CH$— | V- |
| $C_nH_{2n+1}CH=CH$— | nV- |
| $CH_2=CHC_nH_{2n}$— | Vn- |
| $C_nH_{2n+1}CH=CHC_mH_{2m}$— | nVm- |
| $CF_2=CH$— | VFF- |
| $CF_2=CHC_nH_{2n}$— | VFFn- |
| 2) Ring structure —$A_n$— | Symbol |

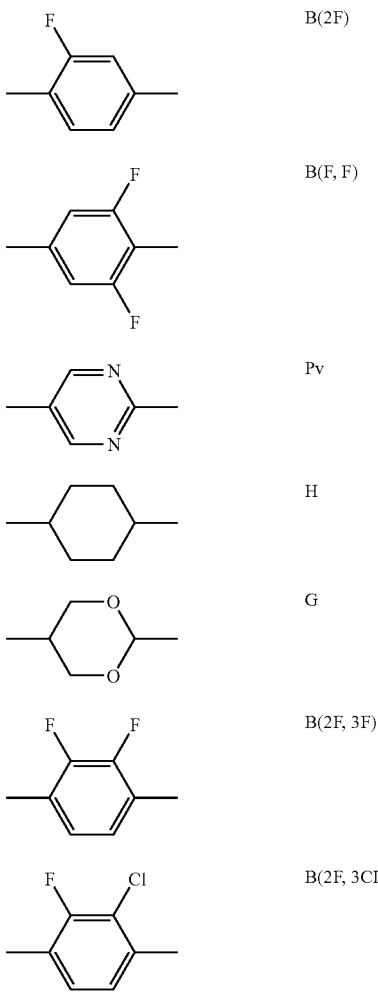

TABLE 2-continued

| Method of Description of Compound using Symbols | |
|---|---|
| 3) Bonding Group —$Z_n$— | Symbol |
| —$C_2H_4$— | 2 |
| —$C_4H_8$— | 4 |
| —CH=CH— | V |
| —COO— | E |
| —C≡C— | T |
| —$CF_2O$— | X |
| 4) Right Terminal Group —R' | Symbol |
| —F | —F |
| —Cl | —CL |
| —CN | —C |
| —$OCF_2H$ | —OCF2H |
| —$OCF_3$ | —OCF3 |
| —$CF_3$ | —CF3 |
| —$C_nH_{2n+1}$ | -n |
| —$OC_nH_{2n+1}$ | —On |
| —CH=$CH_2$ | -V |
| —$C_nH_{2n}CH=CH_2$ | -nV |
| —CH=$CHC_nH_{2n+1}$ | -Vn |
| —$C_nH_{2n}CH=CHC_mH_{2m+1}$ | -nVm |
| —CH=$CF_2$ | -VFF |
| —$COOCH_3$ | -EMe |

TABLE 2-continued

Method of Description of Compound using Symbols

5) Example of Description

Example 1    3-HHEB-F

C₃H₇—⟨cyclohexyl⟩—⟨cyclohexyl⟩—COO—⟨phenyl⟩—F

Example 2    101-HBBH-5

CH₃OCH₂—⟨cyclohexyl⟩—⟨phenyl⟩—⟨phenyl⟩—⟨cyclohexyl⟩—C₅H₁₁

Example 3    1-BBB(2F)-2V

⟨phenyl⟩—⟨phenyl⟩—⟨phenyl-F⟩—CH=CH—

Example 4    3-BBB(F)-2V1

C₃H₇—⟨phenyl⟩—⟨phenyl⟩—⟨phenyl-F⟩—CH=CH—CH₃

Measurement of the characteristics was carried out according to the following methods. Most methods are described in the Standard of Electric Industries Association of Japan, EIAJ ED-2521A or those with some modifications. A TFT was not attached to a TN device used for measurement.

Phase Transition Temperature (° C.)

The measurement was carried out in the method (1) or (2) below. (1) A sample was placed on a hot plate (Hot Stage Model FP-52, produced by Mettler Co., Ltd.) in a melting point apparatus equipped with a polarizing microscope, and while heating at the rate of 1° C. per minute, the temperature where the sample exhibited phase change was measured. (2) A sample was measured by using a scanning calorimeter, DSC-7 System or Diamond DSC System, produced by Perkin-Elmer, Inc., at a rate of 3° C. per minute.

In the following description, a crystal is denoted by "C". In the case where a crystal is distinguished into two crystals, they are denoted by "$C_1$" and "$C_2$", respectively. A smectic phase is denoted by "S". A liquid (isotropic phase) is denoted by "Iso". A nematic phase is denoted by "N". In the case where a smectic phase is distinguished into a smectic B phase, a smectic C phase and a smectic A phase, they are denoted by "$S_B$", "$S_C$" and "$S_A$", respectively. The expression of the phase transition temperatures, "C 92.9 N 196.9 Iso", for example, means that the transition temperature of from a crystal to a nematic phase (CN) is 92.9° C., and the transition temperature of from a nematic phase to a liquid (NI) is 196.9° C. The other expressions are applied with the same rule.

Maximum Temperature of Nematic Phase (NI; ° C.)

A sample was placed on a hot plate in a melting point apparatus equipped with a polarizing microscope, and while heating at the rate of 1° C. per minute. A temperature where a part of the sample was changed from a nematic phase to an isotropic liquid was designated as a maximum temperature of a nematic phase. The maximum temperature of a nematic phase may be abbreviated to "a maximum temperature" in some cases.

Minimum Temperature of Nematic Phase ($T_C$; ° C.)

A sample having a nematic phase was kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals (or a smectic phase) at −30° C., $T_C$ was expressed as $\leq$−20° C. The lower limit of a temperature range of a nematic phase may be abbreviated to "a minimum temperature" in some cases.

Compatibility of Compound

Several compounds having similar structures were mixed to prepare mother liquid crystals having a nematic phase. A compound to be measured and the mother liquid crystals were mixed to obtain a liquid crystal composition. One example of the ratios for mixing were 15% of the compound and 85% the mother liquid crystals. The liquid crystal composition was kept at a low temperature of −20° C. or −30° C. for 30 days. The liquid crystal composition was observed as to whether or not a part of the liquid crystal composition was changed to crystals (or a smectic phase). The mixing ratio and the keeping temperature were changed depending on necessity. As a result of the measurement, conditions under which crystals (or a smectic phase) were deposited, and conditions under which they were not deposited were obtained. The conditions were designated as an index of compatibility.

Viscosity (η; measured at 20° C.; mPa·s)

The viscosity was measured by means of an E-type viscometer.

Rotation Viscosity (γ1; Measured at 25° C.; mPa·s)

(1) Sample Having Positive Dielectric Anisotropy

The rotation viscosity was measured according to the method disclosed in M. Imai, et al., Molecular Crystals and Liquid Crystals, vol. 259, p. 37 (1995). A sample was placed in a TN device having a twist angle of 0° and a cell gap between two glass plates of 5 μm. The TN device was impressed with a voltage in a range of from 16 V to 19.5 V stepwise by 0.5 V. After a period of 0.2 second with no impress of voltage, voltage impress was repeated with only one rectangular wave (rectangular pulse of 0.2 second) and application of no voltage (2 seconds). A peak current and a peak time of a transient current generated by the voltage impress were measured. The rotation viscosity was obtained from the measured values and the calculating equation (8) in the literature by M. Imai, et al., p. 40. As the dielectric anisotropy necessary for the calculation, the value measured by the measuring method of dielectric anisotropy described below by the device used in measurement of the rotation viscosity was used.

(2) Sample Having Negative Dielectric Anisotropy

The rotation viscosity was measured according to the method disclosed in M. Imai, et al., Molecular Crystals and Liquid Crystals, vol. 259, p. 37 (1995). A sample was placed in a VA device having a cell gap between two glass plates of 20 μm. The VA device was impressed with a voltage in a range of from 30 V to 50 V stepwise by 1 V. After a period of 0.2 second with no impress of voltage, voltage impress was repeated with only one rectangular wave (rectangular pulse of 0.2 second) and application of no voltage (2 seconds). A peak current and a peak time of a transient current generated by the voltage impress were measured. The rotation viscosity was obtained from the measured values and the calculating equation (8) in the literature by M. Imai, et al., p. 40. As the dielectric anisotropy necessary for the calculation, the value measured by the measuring method of dielectric anisotropy described below was used.

Refractive Index Anisotropy (Δn; Measured at 25° C.)

Measurement was carried out with an Abbe refractometer mounting a polarizing plate on an ocular using light having a wavelength of 589 nm. The surface of a main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. A value of refractive index anisotropy (Δn) was calculated from the equation; (Δn)=(n∥)−(n⊥). In the case where the sample was a liquid crystal composition, the refractive index anisotropy was measured by this method. In the case where the sample was a compound, the refractive index anisotropy was measured after mixing the compound with a suitable liquid crystal composition. The refractive index anisotropy of the compound was an extrapolated value.

Dielectric Anisotropy (Δ∈; Measured at 25° C.)

In the case where the sample was a compound, the dielectric anisotropy was measured after mixing the compound with a suitable liquid crystal composition. The dielectric anisotropy of the compound was an extrapolated value. In the case where the sample was a liquid crystal composition, the dielectric anisotropy was measured in the following manner.

(1) Liquid Crystal Composition Having Positive Dielectric Anisotropy

A sample was put in a liquid crystal cell having a distance between two glass substrates of about 9 μm and a twist angle of 800. The cell was impressed with a voltage of 20 V to measure a dielectric constant (∈∥) in the major axis direction of the liquid crystal molecule. The cell was impressed with a voltage of 0.5 V to measure a dielectric constant (∈⊥) in the minor axis direction of the liquid crystal molecule. The dielectric anisotropy was calculated from the equation; (Δ∈) =(∈∥)−(∈⊥).

(2) Liquid Crystal Composition Having Negative Dielectric Anisotropy

A sample was put in a liquid crystal cell having been treated to have homeotropic orientation, which was then impressed with a voltage of 0.5 V to measure a dielectric constant (∈∥). A sample was put in a liquid crystal cell having been treated to have homogeneous orientation, which was then impressed with a voltage of 0.5 V to measure a dielectric constant (∈⊥). The dielectric anisotropy was calculated from the equation; (Δ∈)=(∈∥)−(∈⊥).

Threshold Voltage (Vth; Measured at 25° C.; V)

In the case where the sample was a compound, the threshold voltage was measured after mixing the compound with a suitable liquid crystal composition. The threshold voltage of the compound was an extrapolated value. In the case where the sample was a liquid crystal composition, the threshold voltage was measured in the following manner.

(1) Liquid Crystal Composition Having Positive Dielectric Anisotropy

A sample was put in a liquid crystal display device of a normally white mode having a distance between two glass substrates of (0.5/Δn) μm and a twist angle of 80°. The value of Δn was the refractive index anisotropy measured above. Rectangular waves having a frequency of 32 Hz were impressed to the device. The voltage of the rectangular waves was increased, and the voltage was measured when the transmittance of light passing through the device was 90%.

(2) Liquid Crystal Composition Having Negative Dielectric Anisotropy

A sample was put in a liquid crystal display device of a normally black mode having a distance between two glass substrates of about 9 μm and having been treated to have homeotropic orientation. Rectangular waves having a frequency of 32 Hz were impressed to the device. The voltage of the rectangular waves was increased, and the voltage was measured when the transmittance of light passing through the device was 10%.

Voltage Holding Ratio (VHR; Measured at 25° C.; %)

A TN device used for measurement had a polyimide orientation film and the cell gap between two glass substrates was 6 μm. A sample was put into the device, and then the device was sealed with an adhesive which was polymerized by the irradiation of an ultraviolet ray. The TN device was impressed and charged with a pulse voltage (60 microseconds at 5 V). Decreasing voltage was measured for 16.7 milliseconds with High Speed Voltmeter and an area A between the voltage curve and the horizontal axis in a unit cycle was obtained. An area B was an area without decreasing. The voltage holding ratio was a percentage of the area A to the area B.

Helical Pitch (Measured at 20° C.; μm)

A Cano wedge cell method was used for measuring a helical pitch. A sample was put in a Cano wedge cell, and the distance (a; unit: μm) of disclination lines observed from the cell was measured. The helical pitch (P) was calculated from the equation; P=2·a·tan θ. The value θ was an angle between two glass plates in the wedge cell.

The ratios (percentages) of the components or the liquid crystal compounds are percentages by mass based on the total mass of the liquid crystal compounds. The liquid crystal composition is prepared by measuring the mass of the components, such as the liquid crystal compounds, and then mixing them. Accordingly, the percentages by mass of the components can be easily calculated.

There are three cases for measuring the properties, i.e., the case where a compound itself is used as a sample, the case where a compound is mixed with mother liquid crystals to prepare a sample, and the case where a liquid crystal composition itself is used as a sample. In the case where a compound is mixed with mother crystals, the following method is employed. A sample is prepared by mixing 15% by mass of a compound and 85% by mass of mother liquid crystals. The property of the compound is calculated from the values obtained by the measurement through an extrapolation method.

Extrapolated Value=((measured value of sample)− 0.85×(measured value of mother liquid crystals))/ 0.15

In the case where a smectic phase (or crystals) is deposited in the ratio at 25° C., the ratio of the compound and mother liquid crystals is changed to 10% by mass/90% by mass, 5% by mass/95% by mass, and 1% by mass/99% by mass, in this order.

Among the values obtained by measurement, the values obtained by using a compound itself as a sample and the values obtained by using a liquid crystal composition itself as a sample are described as experimental data as they are. The values obtained by using a sample obtained by mixing a compound with mother liquid crystals are described as experimental data as they are in some cases, and the values obtained by an extrapolation method are described in the other cases.

Solvents for diluting the sample may also be chloroform, hexane, and so forth. The following capillary columns may also be used in order to separate the component compound: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). In order to prevent compound peaks from overlapping, a capillary column CBP1-M50-025 (length 50 meters, bore 0.25 millimeters, film thickness 0.25 micrometers) made by Shimadzu Corporation may be used. An area ratio of each peak in the gas chromatogram corresponds to a ratio of the component compound. Percentage by mass of the component compound is not completely identical to an area ratio of each peak. According to the invention, however, percentage by mass of the component compound may be regarded to be identical to an area ratio of each peak, when these capillary columns are used because there is no significant difference in correction efficient of component compounds.

Composition Example 2

| | |
|---|---|
| 1-BBB(2F)-2V1 | 10% |
| 2-BEB(F)-C | 5% |
| 3-BEB(F)-C | 4% |
| 4-BEB(F)-C | 12% |
| 1V2-BEB(F,F)-C | 12% |
| 3-HB-O2 | 8% |
| 3-HH-4 | 3% |
| 3-HHB-F | 3% |
| 3-HHB-1 | 4% |
| 3-HHB-O1 | 4% |
| 3-HBEB-F | 4% |
| 3-HHEB-F | 7% |
| 5-HHEB-F | 7% |
| 3-H2BTB-2 | 4% |
| 3-H2BTB-3 | 4% |
| 3-H2BTB-4 | 4% |
| 3-HB(F)TB-2 | 5% |

Composition Example 3

| | |
|---|---|
| 2-BBB(2F)-2V | 7% |
| 3-BBB(F)-2V | 3% |
| 2-HB-C | 5% |
| 3-HB-C | 12% |
| 3-HB-O2 | 14% |
| 2-BTB-1 | 3% |
| 3-HHB-F | 4% |
| 3-HHB-1 | 8% |
| 3-HHB-O1 | 5% |
| 3-HHB-3 | 13% |
| 3-HHEB-F | 4% |
| 5-HHEB-F | 4% |
| 2-HHB(F)-F | 4% |
| 3-HHB(F)-F | 4% |
| 5-HHB(F)-F | 5% |
| 3-HHB(F,F)-F | 5% |

Composition Example 4

| | |
|---|---|
| 3-BBB(2F)-2V1 | 8% |
| 3-BEB(F)-C | 8% |
| 3-HB-C | 8% |
| V-HB-C | 8% |
| 1V-HB-C | 8% |
| 3-HB-O2 | 3% |
| 3-HH-2V | 12% |
| 3-HH-2V1 | 6% |
| V2-HHB-1 | 10% |
| 3-HHB-1 | 5% |
| 3-HHEB-F | 7% |
| 3-H2BTB-2 | 6% |
| 3-H2BTB-3 | 6% |
| 3-H2BTB-4 | 5% |

Composition Example 5

| | |
|---|---|
| 1-BBB(F)-2V1 | 6% |
| 5-BEB(F)-C | 5% |
| V-HB-C | 11% |
| 5-PyB-C | 6% |
| 4-BB-3 | 7% |
| 3-HH-2V | 10% |
| 5-HH-V | 12% |
| V-HHB-1 | 7% |
| V2-HHB-1 | 12% |
| 3-HHB-1 | 9% |
| 1V2-HBB-2 | 10% |
| 3-HHEBH-3 | 5% |

Composition Example 6

| | |
|---|---|
| 2-BBB(2F)-2V | 8% |
| 1V2-BEB(F,F)-C | 6% |
| 3-HB-C | 18% |
| 2-BTB-1 | 10% |
| 5-HH-VFF | 26% |
| 3-HHB-1 | 4% |
| VFF-HHB-1 | 8% |
| VFF2-HHB-1 | 8% |
| 3-H2BTB-2 | 4% |
| 3-H2BTB-3 | 4% |
| 3-H2BTB-4 | 4% |

NI = 83.8° C.; Δn = 0.143; Δε = 6.9; η = 13.2 mPa·s

Composition Example 7

| | |
|---|---|
| 1-BBB(2F)-2V | 3% |
| 3-BBB(F)-2V1 | 5% |
| 5-HB-CL | 16% |
| 3-HH-4 | 12% |
| 3-HH-5 | 4% |
| 3-HHB-F | 4% |
| 3-HHB-CL | 3% |
| 4-HHB-CL | 4% |
| 3-HHB(F)-F | 8% |
| 4-HHB(F)-F | 7% |
| 5-HHB(F)-F | 7% |

-continued

| | |
|---|---|
| 7-HHB(F)-F | 6% |
| 5-HBB(F)-F | 4% |
| 101-HBBH-5 | 3% |
| 3-HHBB(F,F)-F | 2% |
| 4-HHBB(F,F)-F | 3% |
| 5-HHBB(F,F)-F | 3% |
| 3-HH2BB(F,F)-F | 3% |
| 4-HH2BB(F,F)-F | 3% |

Composition Example 8

| | |
|---|---|
| 2-BBB(2F)-2V | 6% |
| 3-HHB(F,F)-F | 8% |
| 3-H2BB(F,F)-F | 8% |
| 4-H2HB(F,F)-F | 8% |
| 5-H2BB(F,F)-F | 8% |
| 3-HBB(F,F)-F | 20% |
| 5-BBB(F,F)-F | 18% |
| 3-H2BB(F,F)-F | 8% |
| 5-HHBB(F,F)-F | 3% |
| 5-HHEBB-F | 3% |
| 3-HH2BB(F,F)-F | 2% |
| 101-HBBH-4 | 4% |
| 101-HBBH-5 | 4% |

NI = 102.1° C.; Δn = 0.125; Δε = 8.8; η = 34.0 mPa · s

Composition Example 9

| | |
|---|---|
| 3-BBB(2F)-2V1 | 10% |
| 5-HB-F | 12% |
| 6-HB-F | 9% |
| 7-HB-F | 7% |
| 2-HHB-OCF3 | 7% |
| 3-HHB-OCF3 | 7% |
| 4-HHB-OCF3 | 7% |
| 5-HHB-OCF3 | 5% |
| 3-HH2B-OCF3 | 4% |
| 5-HH2B-OCF3 | 4% |
| 3-HHB(F,F)-OCF2H | 4% |
| 3-HHB(F,F)-OCF3 | 5% |
| 3-HH2B(F)-F | 3% |
| 3-HBB(F)-F | 5% |
| 5-HBB(F)-F | 5% |
| 5-HBBH-3 | 3% |
| 3-HB(F)BH-3 | 3% |

Composition Example 10

| | |
|---|---|
| 1-BBB(2F)-2V | 6% |
| 5-HB-CL | 11% |
| 3-HH-4 | 8% |
| 3-HHB-1 | 4% |
| 3-HHB(F,F)-F | 8% |
| 3-HBB(F,F)-F | 18% |
| 5-HBB(F,F)-F | 12% |
| 3-HHEB(F,F)-F | 10% |
| 4-HHEB(F,F)-F | 3% |
| 5-HHEB(F,F)-F | 3% |
| 2-HBEB(F,F)-F | 3% |
| 3-HBEB(F,F)-F | 5% |

-continued

| | |
|---|---|
| 5-HBEB(F,F)-F | 3% |
| 3-HHBB(F,F)-F | 6% |

Composition Example 11

| | |
|---|---|
| 2-BBB(2F)-2V | 7% |
| 2-BBB(F)-2V | 3% |
| 3-HB-CL | 6% |
| 5-HB-CL | 4% |
| 3-HHB-OCF3 | 5% |
| 3-H2HB-OCF3 | 5% |
| 5-H4HB-OCF3 | 12% |
| V-HHB(F)-F | 5% |
| 3-HHB(F)-F | 5% |
| 5-HHB(F)-F | 5% |
| 3-H4HB(F,F)-CF3 | 8% |
| 5-H4HB(F,F)-CF3 | 8% |
| 5-H2HB(F,F)-F | 5% |
| 5-H4HB(F,F)-F | 7% |
| 2-H2BB(F)-F | 3% |
| 3-H2BB(F)-F | 7% |
| 3-HBEB(F,F)-F | 5% |

NI = 75.7° C.; Δn = 0.113; Δε = 8.2; η = 24.1 mPa · s

Composition Example 12

| | |
|---|---|
| 2-BBB(2F)-2V | 8% |
| 5-HB-CL | 17% |
| 7-HB(F,F)-F | 3% |
| 3-HH-4 | 10% |
| 3-HH-5 | 5% |
| 3-HB-O2 | 12% |
| 3-HHB-1 | 7% |
| 3-HHB-O1 | 5% |
| 2-HHB(F)-F | 6% |
| 3-HHB(F)-F | 6% |
| 5-HHB(F)-F | 6% |
| 3-HHB(F,F)-F | 5% |
| 3-H2HB(F,F)-F | 5% |
| 4-H2HB(F,F)-F | 5% |

NI = 75.3° C.; Δn = 0.088; Δε = 3.0; η = 14.1 mPa · s

Composition Example 13

| | |
|---|---|
| 1-BBB(2F)-2V | 8% |
| 5-HB-CL | 3% |
| 7-HB(F)-F | 7% |
| 3-HH-4 | 9% |
| 3-HH-EMe | 15% |
| 3-HHEB-F | 8% |
| 5-HHEB-F | 8% |
| 3-HHEB(F,F)-F | 10% |
| 4-HHEB(F,F)-F | 5% |
| 4-HGB(F,F)-F | 5% |
| 5-HGB(F,F)-F | 6% |
| 2-H2GB(F,F)-F | 4% |
| 3-H2GB(F,F)-F | 5% |
| 5-GHB(F,F)-F | 7% |

Composition Example 14

| | |
|---|---|
| 2-BBB(2F)-2V | 6% |
| 1-BBB(2F)-2V | 6% |
| 3-HH-4 | 10% |
| 3-HHB-1 | 6% |
| 3-HHB(F,F)-F | 10% |
| 3-H2HB(F,F)-F | 10% |
| 3-HBB(F,F)-F | 35% |
| 101-HBBH-5 | 7% |
| 2-HHBB(F,F)-F | 3% |
| 3-HHBB(F,F)-F | 3% |
| 3-HH2BB(F,F)-F | 4% |

Composition Example 15

| | |
|---|---|
| 2-BBB(2F)-2V | 8% |
| 3-HH-4 | 5% |
| 3-HH-5 | 5% |
| 3-HH-O1 | 6% |
| 3-HH-O3 | 6% |
| 3-HB-O1 | 5% |
| 3-HB-O2 | 5% |
| 3-HB(2F,3F)-O2 | 10% |
| 5-HB(2F,3F)-O2 | 10% |
| 3-HHB(2F,3F)-O2 | 10% |
| 5-HHB(2F,3F)-O2 | 12% |
| 2-HHB(2F,3F)-1 | 4% |
| 3-HHB(2F,3F)-2 | 4% |
| 3-HHEH-3 | 4% |
| 3-HHEH-5 | 3% |
| 4-HHEH-3 | 3% |

NI = 83.8° C.; Δn = 0.091; Δε = −2.7; η = 26.0 mPa·s

Composition Example 16

| | |
|---|---|
| 1-BBB(2F)-2V | 6% |
| 3-HH-V | 26% |
| 3-H2B(2F,3F)-O2 | 17% |
| 5-H2B(2F,3F)-O2 | 17% |
| 3-HHB(2F,3CL)-O2 | 4% |
| 4-HHB(2F,3CL)-O2 | 3% |
| 5-HHB(2F,3CL)-O2 | 3% |
| 3-HBB(2F,3CL)-O2 | 8% |
| 5-HBB(2F,3CL)-O2 | 9% |
| V-HHB-1 | 5% |
| 2-BB(F)B-3 | 2% |

Composition Example 17

| | |
|---|---|
| 3-BBB(2F)-2V1 | 6% |
| 5-HB-CL | 10% |
| 3-HB-O2 | 8% |
| 3-HBB(F,F)-F | 10% |
| 3-PyB(F)-F | 10% |
| 5-PyB(F)-F | 10% |
| 3-PyBB-F | 10% |
| 4-PyBB-F | 10% |
| 5-PyBB-F | 10% |

-continued

| | |
|---|---|
| 5-HBB(F)B-2 | 8% |
| 5-HBB(F)B-3 | 8% |

The invention claimed is:

1. A compound represented by formula (1):

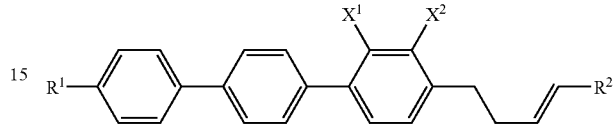

(1)

wherein in formula (1), $R^1$ is hydrogen or alkyl having 1 to 5 carbons; one of $X^1$ and $X^2$ is hydrogen, and the other thereof is fluorine; and $R^2$ is hydrogen or methyl.

2. The compound according to claim 1, wherein $R^2$ is hydrogen.

3. The compound according to claim 2, wherein $X^1$ is fluorine, and $X^2$ is hydrogen.

4. A liquid crystal composition comprising at least one compound according to claim 1.

5. The liquid crystal composition according to claim 4, wherein the liquid crystal composition further comprises at least one compound selected from the group of compound represented by formulas (2), (3) and (4):

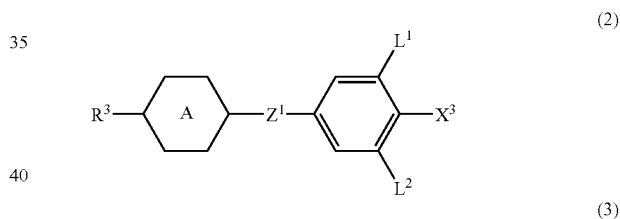

(2)

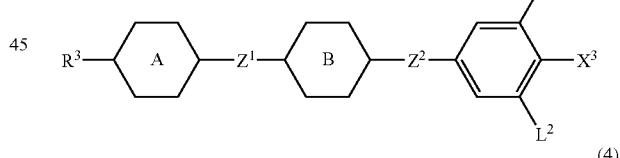

(3)

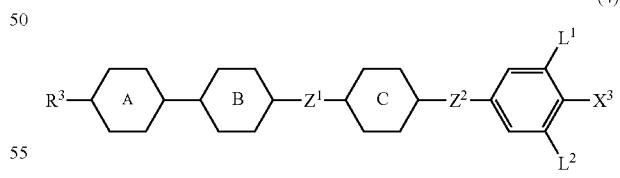

(4)

wherein in formulas (2) to (4), $R^3$ is independently alkyl having 1 to 10 carbons or alkenyl having 2 to 10 carbons, in the alkyl and alkenyl arbitrary hydrogen may be replaced by fluorine, and in the alkyl arbitrary —$CH_2$— may be replaced by —O—;

$X^3$ is independently fluorine, chlorine, —$OCF_3$, —$OCHF_2$, —$CF_3$, —$CHF_2$, —$CH_2F$, —$OCF_2CHF_2$ or —$OCF_2CHFCF_3$;

ring A and ring B are each independently 1,4-cyclohexylene, 1,3-dioxane-2,5-diyl or 1,4-phenylene in which arbitrary hydrogen may be replaced by fluorine; ring C is 1,4-cyclohexylene or 1,4-phenylene in which arbitrary hydrogen may be replaced by fluorine;

$Z^1$ and $Z^2$ are each independently —$(CH_2)_2$—, —$(CH_2)_4$—, —COO—, —$CF_2O$—, —$OCF_2$—, —CH=CH— or a single bond; and $L^1$ and $L^2$ are each independently hydrogen or fluorine.

6. The liquid crystal composition according to claim 4, wherein the liquid crystal composition further comprises at least one compound selected from the group of compound represented by formulas (5) and (6):

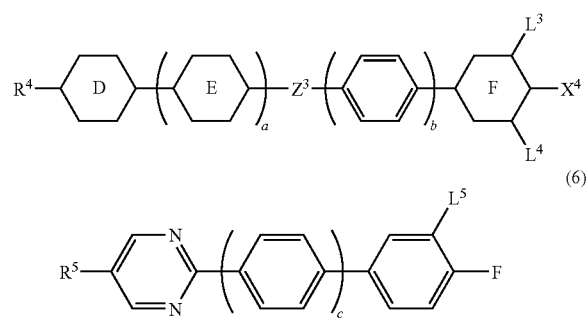

(5)

(6)

wherein in formulas (5) and (6), $R^4$ and $R^5$ are each independently alkyl having 1 to 10 carbons or alkenyl having 2 to 10 carbons, in the alkyl and alkenyl arbitrary hydrogen may be replaced by fluorine, and in the alkyl arbitrary —$CH_2$— may be replaced by —O—;

$X^4$ is —C≡N or —C≡C—C≡N;

ring D is 1,4-cyclohexylene, 1,4-phenylene, 1,3-dioxane-2,5-diyl or pyrimidine-2,5-diyl;

ring E is 1,4-cyclohexylene, pyrimidine-2,5-diyl or 1,4-phenylene in which arbitrary hydrogen may be replaced by fluorine; ring F is 1,4-cyclohexylene or 1,4-phenylene;

$Z^3$ is —$(CH_2)_2$—, —COO—, —$CF_2O$—, —$OCF_2$— or a single bond;

$L^3$, $L^4$ and $L^5$ are each independently hydrogen or fluorine; and a, b and c are each independently 0 or 1.

7. The liquid crystal composition according to claim 4, wherein the liquid crystal composition further comprises at least one compound selected from the group of compound represented by formulas (7), (8), (9), (10) and (11):

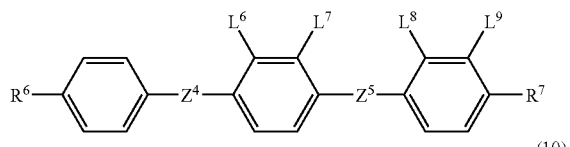

(7)

(8)

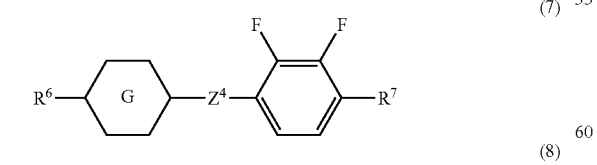

(9)

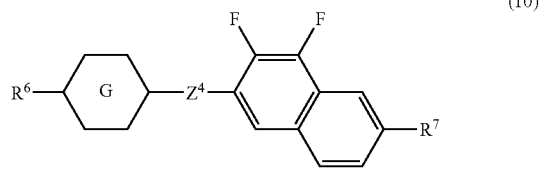

(10)

(11)

wherein in formulas (7) to (11), $R^6$ is independently alkyl having 1 to 10 carbons or alkenyl having 2 to 10 carbons, in the alkyl and alkenyl arbitrary hydrogen may be replaced by fluorine, and in the alkyl arbitrary —$CH_2$— may be replaced by —O—;

$R^7$ is independently fluorine, alkyl having 1 to 10 carbons or alkenyl having 2 to 10 carbons, in the alkyl and alkenyl arbitrary hydrogen may be replaced by fluorine, and in the alkyl arbitrary —$CH_2$— may be replaced by —O—;

ring G and ring J are each independently 1,4-cyclohexylene, 1,4-phenylene or decahydro-2,6-naphthylene;

$Z^4$ and $Z^5$ are each independently —$(CH_2)_2$—, —COO— or a single bond; and $L^6$, $L^7$, $L^8$ and $L^9$ are each independently hydrogen or fluorine, provided that at least two of $L^6$, $L^7$, $L^8$ and $L^9$ are fluorine.

8. The liquid crystal composition according to claim 4, wherein the liquid crystal composition further comprises at least one compound selected from the group of compound represented by formulas (12), (13) and (14):

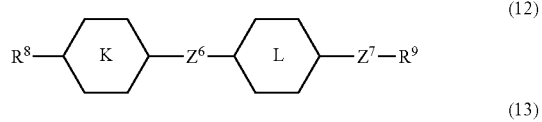

(12)

(13)

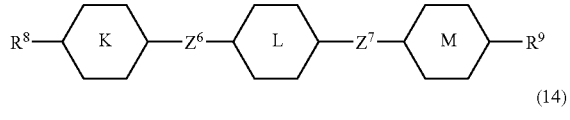

(14)

wherein in formulas (12) to (14), $R^8$ and $R^9$ each independently alkyl having 1 to 10 carbons or alkenyl having 2 to 10 carbons, in the alkyl and alkenyl arbitrary hydrogen may be replaced by fluorine, and in the alkyl arbitrary —$CH_2$— may be replaced by —O—;

ring L is independently 1,4-cyclohexylene, pyrimidine-2,5-diyl, 1,4-phenylene, 2-fluoro-1,4-phenylene, 3-fluoro-1,4-phenylene or 2,5-difluorophenylene;

ring K and ring M are each independently 1,4-cyclohexylene, pyrimidine-2,5-diyl, 1,4-phenylene or 2,5-difluorophenylene; and $Z^6$ and $Z^7$ are each independently —C≡C—, —COO—, —(CH$_2$)$_2$—, —CH═CH— or a single bond.

9. The liquid crystal composition according to claim 5, wherein the liquid crystal composition further comprises at least one compound selected from the group of compound represented by formulas (5) and (6):

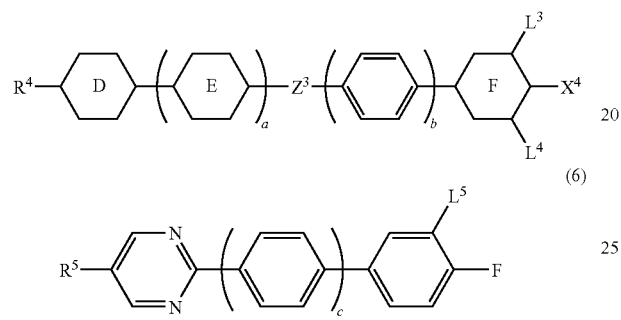

wherein in formulas (5) and (6), $R^4$ and $R^5$ are each independently alkyl having 1 to 10 carbons or alkenyl having 2 to 10 carbons, in the alkyl and alkenyl arbitrary hydrogen may be replaced by fluorine, and in the alkyl arbitrary —CH$_2$— may be replaced by —O—;

$X^4$ is —C≡N or —C≡C—C≡N;

ring D is 1,4-cyclohexylene, 1,4-phenylene, 1,3-dioxane-2,5-diyl or pyrimidine-2,5-diyl;

ring E is 1,4-cyclohexylene, pyrimidine-2,5-diyl or 1,4-phenylene in which arbitrary hydrogen may be replaced by fluorine; ring F is 1,4-cyclohexylene or 1,4-phenylene;

$Z^3$ is —(CH$_2$)$_2$—, —COO—, —CF$_2$O—, —OCF$_2$— or a single bond;

$L^3$, $L^4$ and $L^5$ are each independently hydrogen or fluorine; and a, b and c are each independently 0 or 1.

10. The liquid crystal composition according to claim 5, wherein the liquid crystal composition further comprises at least one compound selected from the group of compound represented by formulas (12), (13) and (14):

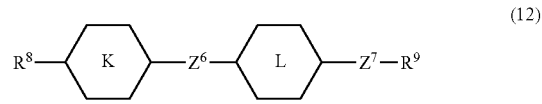

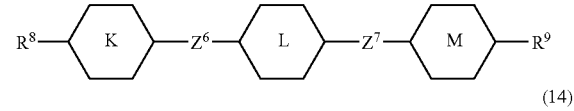

wherein in formulas (12) to (14), $R^8$ and $R^9$ each independently alkyl having 1 to 10 carbons or alkenyl having 2 to 10 carbons, in the alkyl and alkenyl arbitrary hydrogen may be replaced by fluorine, and in the alkyl arbitrary —CH$_2$— may be replaced by —O—;

ring L is independently 1,4-cyclohexylene, pyrimidine-2,5-diyl, 1,4-phenylene, 2-fluoro-1,4-phenylene, 3-fluoro-1,4-phenylene or 2,5-difluorophenylene;

ring K and ring M are each independently 1,4-cyclohexylene, pyrimidine-2,5-diyl, 1,4-phenylene or 2,5-difluorophenylene; and $Z^6$ and $Z^7$ are each independently —COO—, —(CH$_2$)$_2$—, —CH═CH— or a single bond.

11. The liquid crystal composition according to claim 6, wherein the liquid crystal composition further comprises at least one compound selected from the group of compound represented by formulas (12), (13) and (14):

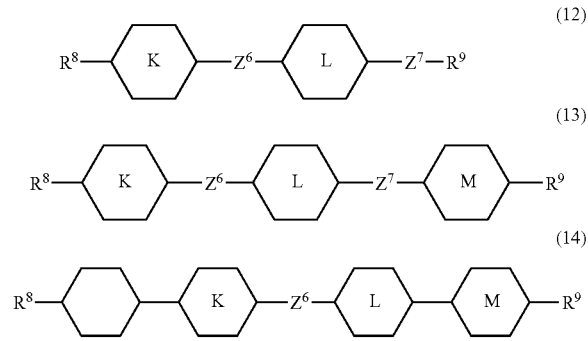

wherein in formulas (12) to (14), $R^8$ and $R^9$ each independently alkyl having 1 to 10 carbons or alkenyl having 2 to 10 carbons, in the alkyl and alkenyl arbitrary hydrogen may be replaced by fluorine, and in the alkyl arbitrary —CH$_2$— may be replaced by —O—;

ring L is independently 1,4-cyclohexylene, pyrimidine-2,5-diyl, 1,4-phenylene, 2-fluoro-1,4-phenylene, 3-fluoro-1,4-phenylene or 2,5-difluorophenylene;

ring K and ring M are each independently 1,4-cyclohexylene, pyrimidine-2,5-diyl, 1,4-phenylene or 2,5-difluorophenylene; and $Z^6$ and $Z^7$ are each independently —COO—, —(CH$_2$)$_2$—, —CH═CH— or a single bond.

12. The liquid crystal composition according to claim 7, wherein the liquid crystal composition further comprises at least one compound selected from the group of compound represented by formulas (12), (13) and (14):

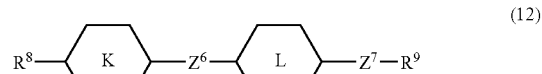

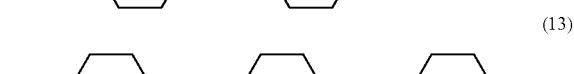

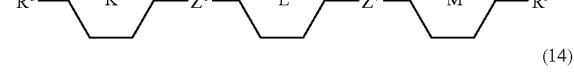

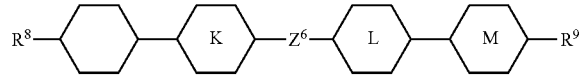

wherein in formulas (12) to (14), $R^8$ and $R^9$ each independently alkyl having 1 to 10 carbons or alkenyl having 2 to 10 carbons, in the alkyl and alkenyl arbitrary hydrogen may be replaced by fluorine, and in the alkyl arbitrary —$CH_2$— may be replaced by —O—;

- ring L is independently 1,4-cyclohexylene, pyrimidine-2,5-diyl, 1,4-phenylene, 2-fluoro-1,4-phenylene, 3-fluoro-1,4-phenylene or 2,5-difluorophenylene;
- ring K and ring M are each independently 1,4-cyclohexylene, pyrimidine-2,5-diyl, 1,4-phenylene or 2,5-difluorophenylene; and
- $Z^6$ and $Z^7$ are each independently —C≡C—, —COO—, —$(CH_2)_2$—, —CH=CH— or a single bond.

13. The liquid crystal composition according to claim 4, wherein the liquid crystal composition further comprises an optically active compound.

14. A liquid crystal display device comprising the liquid crystal composition according to claim 4.

15. The liquid crystal composition according to claim 5, wherein the liquid crystal composition further comprises an optically active compound.

16. The liquid crystal composition according to claim 6, wherein the liquid crystal composition further comprises an optically active compound.

17. The liquid crystal composition according to claim 7, wherein the liquid crystal composition further comprises an optically active compound.

18. The liquid crystal composition according to claim 8, wherein the liquid crystal composition further comprises an optically active compound.

19. The liquid crystal composition according to claim 9, wherein the liquid crystal composition further comprises an optically active compound.

20. The liquid crystal composition according to claim 10, wherein the liquid crystal composition further comprises an optically active compound.

21. The liquid crystal composition according to claim 11, wherein the liquid crystal composition further comprises an optically active compound.

22. The liquid crystal composition according to claim 12, wherein the liquid crystal composition further comprises an optically active compound.

* * * * *